US009990427B2

(12) United States Patent
Nishibe

(10) Patent No.: US 9,990,427 B2
(45) Date of Patent: Jun. 5, 2018

(54) INFORMATION PROCESSING APPARATUS AND RECORDING MEDIUM

(71) Applicant: SONY CORPORATION, Tokyo (JP)

(72) Inventor: Mitsuru Nishibe, Chiba (JP)

(73) Assignee: SONY CORPORATION, Tokyo (JP)

(*) Notice: Subject to any disclaimer, the term of this patent is extended or adjusted under 35 U.S.C. 154(b) by 70 days.

(21) Appl. No.: 14/662,956

(22) Filed: Mar. 19, 2015

(65) Prior Publication Data
US 2015/0277963 A1 Oct. 1, 2015

(30) Foreign Application Priority Data

Mar. 28, 2014 (JP) ................. 2014-069157

(51) Int. Cl.
G06F 17/00 (2006.01)
G06F 17/30 (2006.01)
G11B 20/00 (2006.01)
G06F 21/60 (2013.01)
G06Q 30/02 (2012.01)
G06F 9/50 (2006.01)
G06F 17/22 (2006.01)

(52) U.S. Cl.
CPC ...... *G06F 17/30861* (2013.01); *G06F 9/5027* (2013.01); *G06F 9/5072* (2013.01); *G06F 17/2247* (2013.01); *G06F 17/30899* (2013.01); *G06F 17/30905* (2013.01); *G06F 21/608* (2013.01); *G06F 2209/5018* (2013.01); *G06Q 30/02* (2013.01); *G11B 20/00086* (2013.01)

(58) Field of Classification Search
CPC ......... G06F 17/30899; G06F 17/30861; G06F 17/2247; G06F 9/5072; G06F 21/20; G06Q 30/02; G11B 20/00086
USPC ................ 715/206, 738, 797, 802, 804, 807
See application file for complete search history.

(56) References Cited

U.S. PATENT DOCUMENTS

| 2004/0010755 | A1* | 1/2004 | Hamada | G06F 17/24 |
| | | | | 715/255 |
| 2006/0015520 | A1* | 1/2006 | Lahtiranta | G06Q 30/0603 |
| 2006/0064760 | A1* | 3/2006 | Eyer | H04L 63/0823 |
| | | | | 726/26 |
| 2006/0248091 | A1* | 11/2006 | Yamamoto | H04N 21/235 |
| 2007/0024753 | A1* | 2/2007 | Fujiwara | H04N 5/45 |
| | | | | 348/565 |
| 2012/0036475 | A1* | 2/2012 | Yoshitomi | G06F 3/0482 |
| | | | | 715/810 |
| 2013/0159827 | A1* | 6/2013 | Wong | G06F 17/30905 |
| | | | | 715/205 |

FOREIGN PATENT DOCUMENTS

JP 2008-225783 A 9/2008

* cited by examiner

Primary Examiner — Quoc A Tran
(74) Attorney, Agent, or Firm — Chip Law Group

(57) ABSTRACT

There is provided an information processing apparatus including an acquisition section which acquires a plurality of sub-contents included in each of one or more contents, and a management section which associates the acquired plurality of sub-contents with at least any one process from among a plurality of processes for executing processing related to an output of one or more of the sub-contents.

20 Claims, 15 Drawing Sheets

FIG. 13 d10

| META INFORMATION (URL) | PAGE PROCESS |
|---|---|
| http://www.xxx.・・・.xxx100 | 0013a |
| http://www.yyy.・・・.yyyyyy | 0013c |
| http://www.zzz.・・・.zzz210 | 0013b |
| http://www.zzz.・・・.zzz211 | 0013c | d11 — column 1 header
d13 — column 2 header

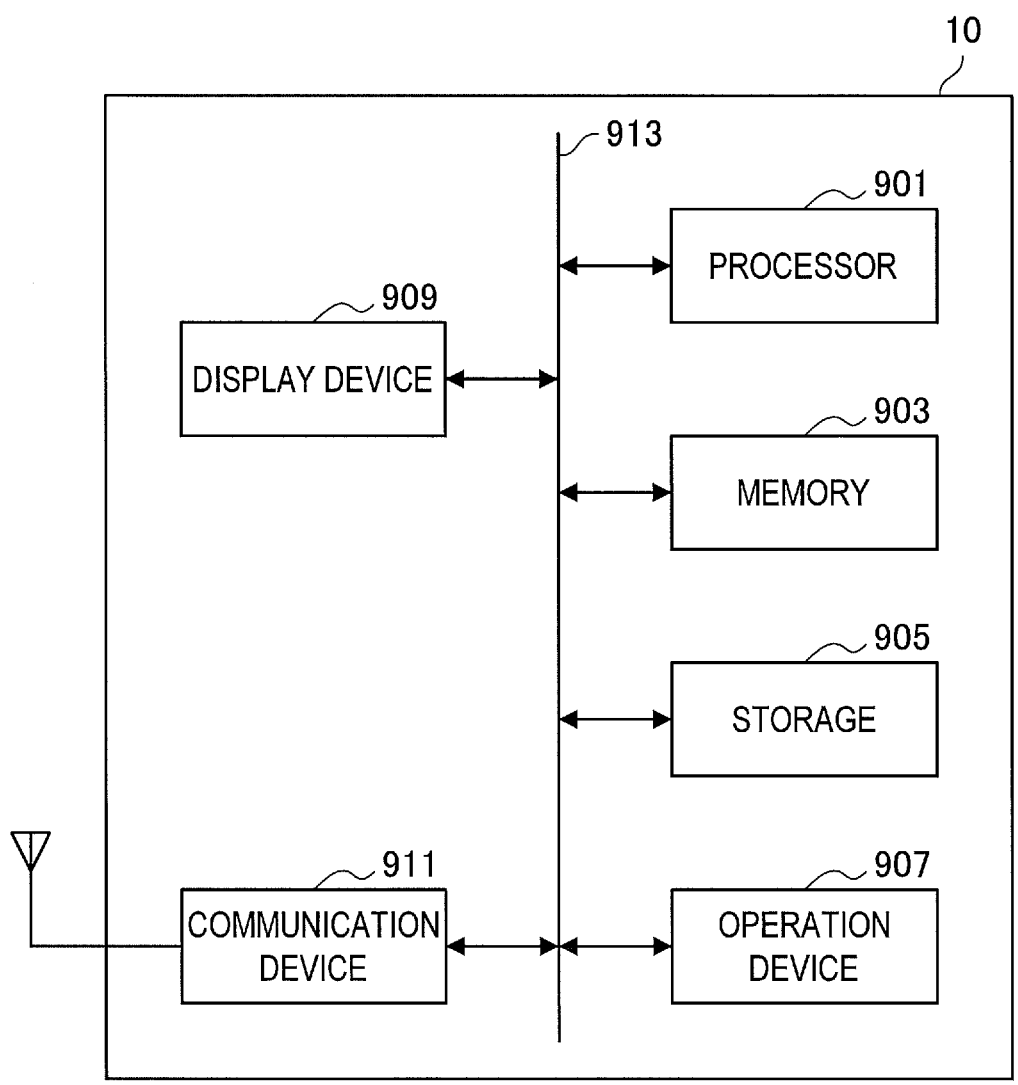

INFORMATION PROCESSING APPARATUS AND RECORDING MEDIUM

CROSS REFERENCE TO RELATED APPLICATIONS

This application claims the benefit of Japanese Priority Patent Application JP 2014-069157 filed Mar. 28, 2014, the entire contents of which are incorporated herein by reference.

BACKGROUND

The present disclosure relates to an information processing apparatus and a recording medium.

In recent years, there have been cases where image information, such as still images or moving images not limited to text information such as written material, are provided via a network such as the internet as contents (for example, Web contents). Such contents are diverse, and it will often be the case that contents are provided in which a plurality of sub-contents are embedded within a same page, and there will also be cases where external contents such as Web advertisements are embedded as these sub-contents.

Contents such as those described above are read, for example, by browser software (hereinafter, there will be cases where these are collectively called a "browser") such as a browser operated by a user terminal such as a Personal Computer (PC), and are displayed on a screen of this user terminal (refer to JP 2008-225783A).

SUMMARY

On the other hand, along with the diversification of contents, the number of sub-contents displayed on a browser has tended to increase. Accordingly, it will often be the case that the processes which may be necessary for outputting these contents, or the amount of resources such as memory used by these processes, increase.

Accordingly, the present disclosure provides a new and improved information processing apparatus and recording medium capable of more efficiently using resources for outputting a plurality of sub-contents.

According to an embodiment of the present disclosure, there is provided an information processing apparatus including an acquisition section which acquires a plurality of sub-contents included in each of one or more contents, and a management section which associates the acquired plurality of sub-contents with at least any one process from among a plurality of processes for executing processing related to an output of one or more of the sub-contents.

According to an embodiment of the present disclosure, there is provided a non-transitory computer-readable recording medium having a program recorded therein, the program causing a computer to execute acquiring a plurality of sub-contents included in each of one or more contents, and associating the acquired plurality of sub-contents with at least any one process from among a plurality of processes for executing processing related to an output of one or more of the sub-contents.

According to an embodiment of the present disclosure such as described above, it becomes possible to provide an information processing apparatus and a recording medium capable of more efficiently using resources for outputting a plurality of sub-contents.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 13 shows an example of management information;

FIG. 16 is a figure which shows an example of a hardware configuration of the information processing apparatus 10 according to the embodiment.

DETAILED DESCRIPTION OF THE EMBODIMENT(S)

Figure 1:
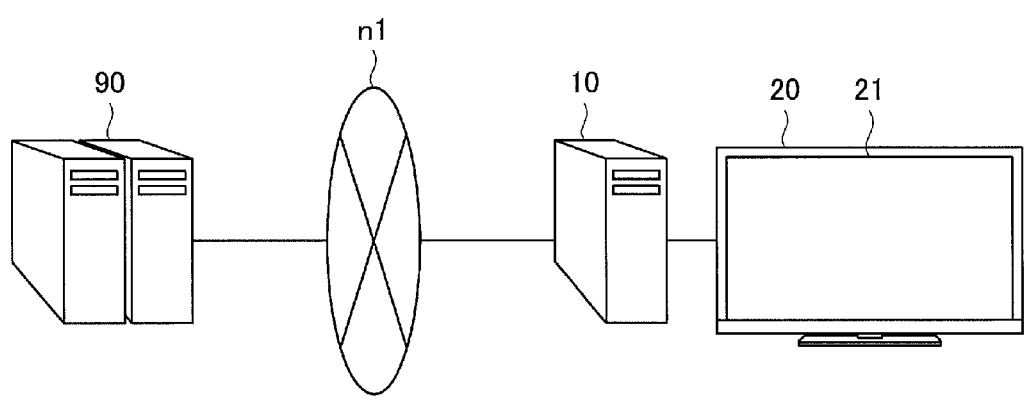
FIG. 1 is an explanatory diagram for describing an example of a schematic system configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Embodiments
   1.1. Outline 1.2. Arrangement of the problem
1.3. Outline of the process management method
1.4. Functional configuration
1.4.1. Classification of sub-contents
1.4.2. Allocation of sub-contents to processes
1.4.3. Processing based on an input event
2. Embodiment examples
2.1. Embodiment example 1: Classification based on the distribution source
2.2. Embodiment example 2: Classification based on the type of sub-contents
2.3. Embodiment example 3: Classification based on the processing type
2.4. Embodiment example 4: Classification of sub-contents protected by a security function
2.5. Embodiment example 5: Classification based on the occupancy rate of resources
2.6. Embodiment example 6: Weighting between sub-contents
2.7. Embodiment example 7: Weighting between page processes
3. Modified example
4. Hardware configuration
5. Summary 1. Embodiments 1.1. Outline First, an outline of an information processing system according to an embodiment of the present disclosure will be described with reference to FIG. 1. FIG. 1 is an explanatory diagram for describing an example of a schematic system configuration of the information processing system according to an embodiment of the present disclosure.

As shown in FIG. 1, for example, the information processing system according to the present embodiment includes an information processing apparatus 10, a display device 20, and a server 90. The information processing apparatus 10 and the server 90 are constituted to be capable of mutually transmitting and receiving information via a network n1. The network n1 can be constituted, for example, by the internet, an exclusive line, a Local Area Network (LAN), a Wide Area Network (WAN) or the like. Note that, the mode of the network n1 will not be limited if it is a network which connects between different apparatuses.

The server 90 is a configuration which corresponds to a so-called Web server, proxy server or edge server. The server 90 distributes image information, such as still images or moving images not limited to text information such as written material, to the information processing apparatus 10 via the network n1 as contents (for example, Web contents).

The information processing apparatus 10 is an apparatus for browsing contents distributed from the server 90, in other words, for operating a browser. The information processing apparatus 10 starts a browser based on an instruction from a user, and causes a display screen of this browser to be displayed on a display section 21 of the display device 20, which will be described later. Also, the information processing apparatus 10 acquires contents distributed from the server 90, and causes these contents to be displayed on the display screen of the browser.

A user terminal such as a PC will be included as a specific example of the information processing apparatus 10. Further, the configuration of the information processing apparatus 10 will not necessarily be limited to a PC if it can operate a browser and present contents to a user via this browser. For example, the information processing apparatus 10 may be an electronic apparatus such as a television apparatus capable of accessing the network n1 (for example, the internet or a LAN).

The display device 20 is a device, for example, for displaying information such as a display or the like. The display device 20 includes a display section 21 (for example, a display panel) for information display, and causes information to be displayed on the display section 21 based on a control from the information processing apparatus 10. Note that, the information processing apparatus 10 and the display device 20 may be constituted separately, or may be integrally constituted.

Figure 2:
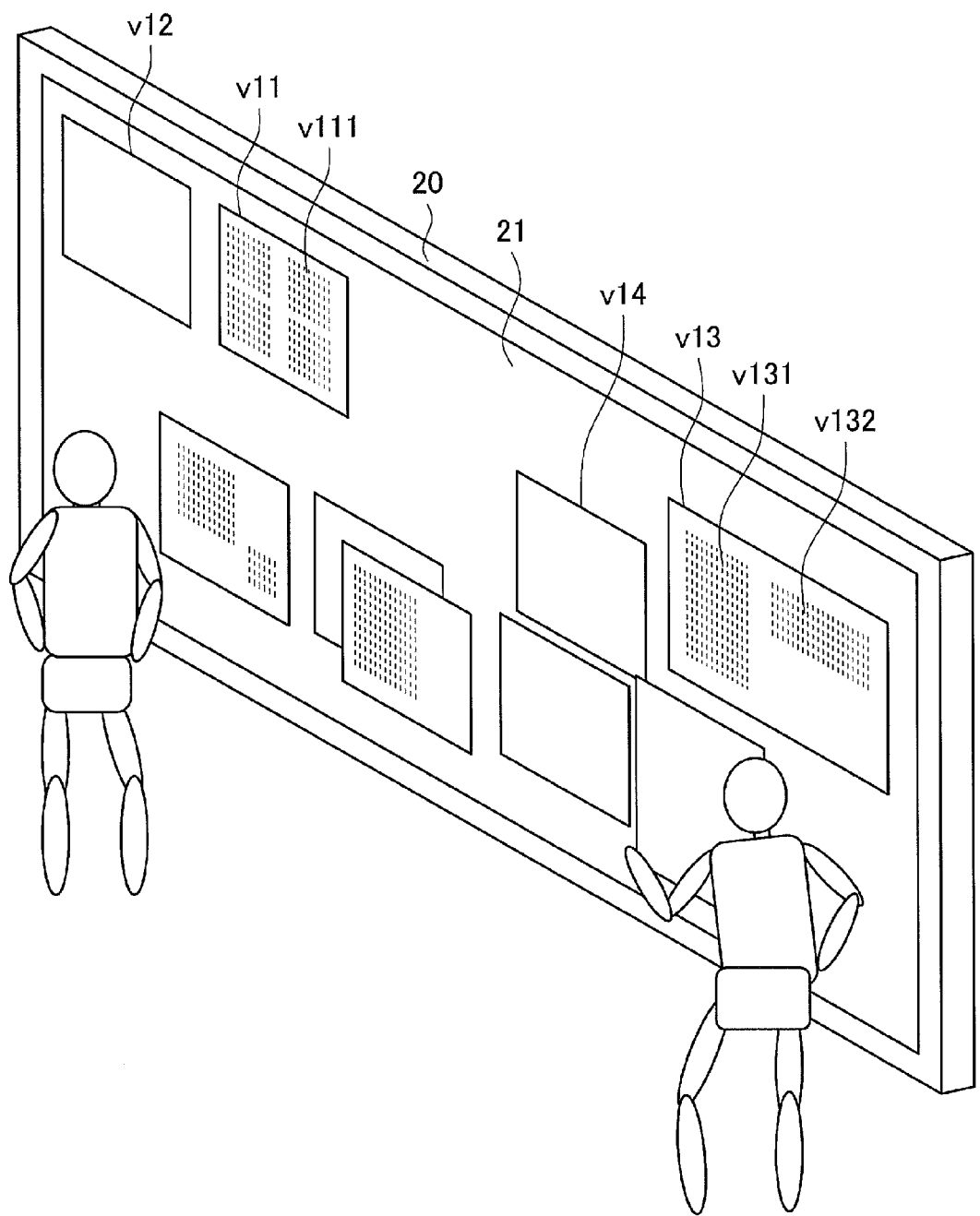
FIG. 2 is an explanatory diagram for describing an example of a usage scene of the information processing system according to the embodiment.

For example, an example of the display device 20 used in the information processing system according to the present embodiment is shown in FIG. 2. FIG. 2 is an explanatory diagram for describing an example of a usage scene of the information processing system according to the present embodiment. In the example shown in FIG. 2, the information processing system uses an apparatus, as the display device 20, which includes a comparatively large display section 21 capable of being referred to at the same time by a plurality of users, and is constituted to be capable of having these users browse a plurality of contents v11 to v14 at the same time.

Note that, within the displayed contents, for example, separate contents are embedded as sub-frames within frames for displaying these contents, such as frame pages of Web contents. As a specific example, there will be cases where external contents such as Web advertisements are embedded within contents (for example, Web pages) provided by a Social Networking Service (SNS). In this way, hereinafter, there will be cases where other contents included within a content (for example, other contents embedded within a content) are called "sub-contents".

For example, in the case of the example shown in FIG. 2, the content v13 includes sub-contents v131 and v132. At this time, one of the sub-contents from among the sub-contents v131 and v132 may be a content distributed from a transmission source (domain) different to that of the other sub-content.

Further, the information processing apparatus 10 according to the present embodiment may cause a plurality of contents to be displayed on the display section 21 of the display device 20 by separating each of the contents into a plurality of layers. For example, FIG. 3 is an explanatory diagram for describing an example of a usage scene of the information processing system according to the present embodiment, and is a figure which schematically shows the case where a plurality of contents are displayed by separating each of the contents into a plurality of layers.

Figure 3:
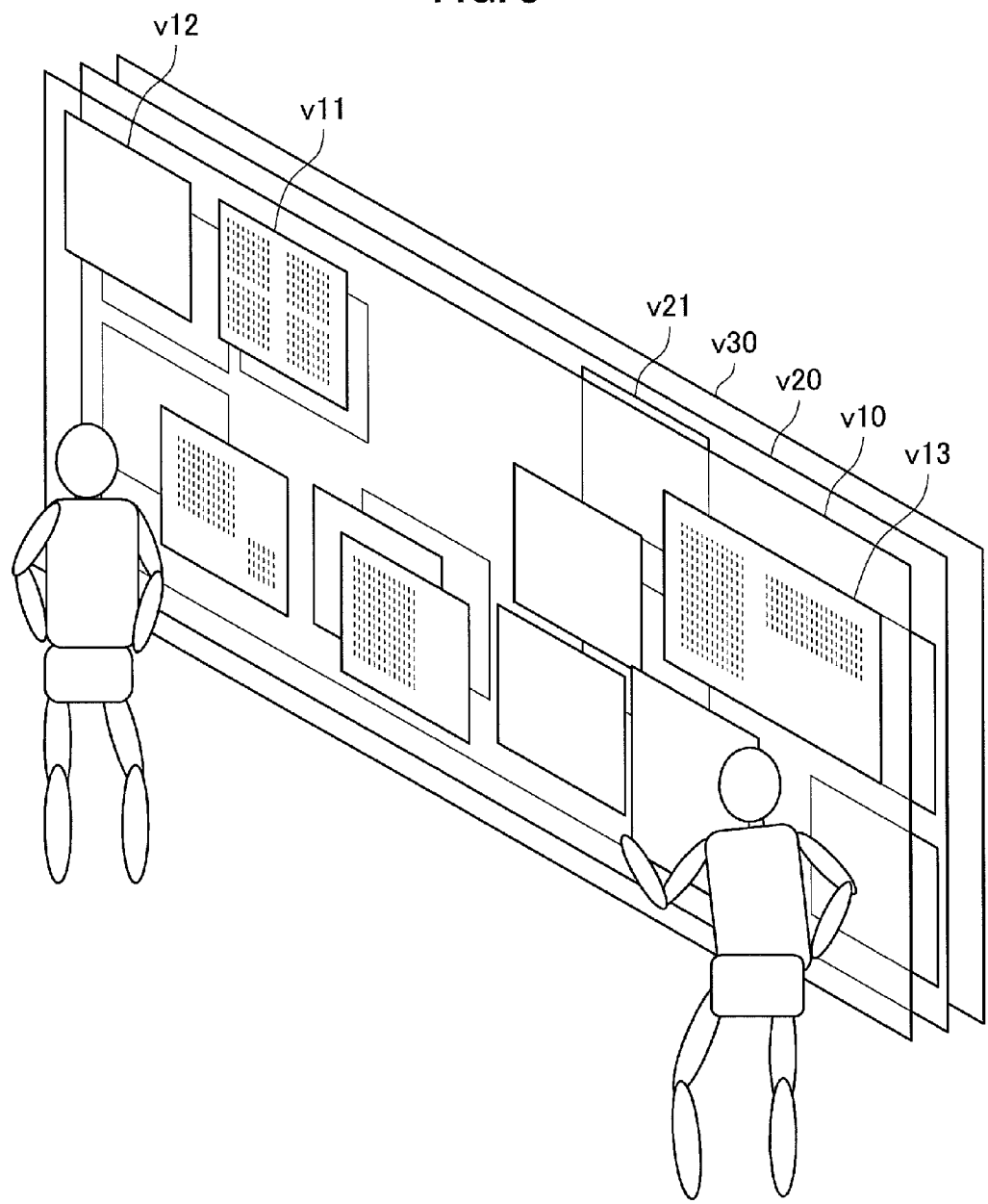
FIG. 3 is an explanatory diagram for describing an example of a usage scene of the information processing system according to the embodiment.

For example, in the example shown in FIG. 3, layers v10 to v30 are arranged so as to be virtually superimposed, along the depth direction of the screen displayed on the display section 21, and contents allocated to each of the layers are respectively displayed. For example, the contents v11 to v13 are allocated to the layer v10, and these contents v11 to v13 are displayed on this layer v10. Similarly, the content v21 is allocated to the layer v20, and this content v21 is displayed on this layer v20.

In the case of the example shown in FIG. 3, for example, the information processing apparatus 10 may switch the contents presented to a user for each of the layers, by switching the order of the layers v10 to v30 along the depth direction of the screen displayed on the display section 21, in accordance with an instruction from the user.

1.2. Arrangement of the Problem

Next, the problem of the information processing system according to the present embodiment will be arranged as follows, in particular, by focusing on the case where the information processing apparatus 10 is assumed to have the configuration shown in FIG. 1 to FIG. 3, by describing an example of schematic processes for outputting (for example, displaying) each of the contents.

The information processing apparatus 10 manages processing for outputting each of the contents (or, each of the sub-contents) for each processing unit which is called a process. Note that, for example, a process shows a virtual resource of the case where an Operating System (OS) operating each of the functions of the information processing apparatus 10 executes each processing (program). This OS executes, for example, processing for outputting the contents in process units. Note that, the information processing apparatus 10 may execute processing for displaying contents for each of the resources which are called threads more detailed than the processes. Note that, hereinafter, in order to easily understand the description, the information processing apparatus 10 will be described as managing processing related to an output of each of the contents in process units.

In recent years, along with the diversification of contents, the number of sub-contents displayed on a screen of a browser has tended to increase. Accordingly, the processes which may be necessary for outputting these contents, or the amount of resources such as memory used by these processes, have tended to increase.

However, it will often be the case that the information processing apparatus 10 is limited by software or hardware factors in the resources for outputting contents or sub-contents (for example, the processes, or memory used by these processes). As a specific example, there will be cases where the maximum value of the number of processes capable of being managed at once by the information processing apparatus 10 is determined depending on the management method of processes by an OS or the capacity of memory.

Accordingly, for example, as shown in FIG. 2 and FIG. 3, in the case where a plurality of contents or contents including a plurality of sub-contents are output, a mechanism capable of more efficiently using resources of the information processing apparatus 10 will be sought after.

Accordingly, in order to arrange the problem of the information processing system according to the present embodiment in more detail, hereinafter, examples of a method which allocates a plurality of contents to processes, as an example of resource management for outputting contents, will be described as a first comparative example and a second comparative example.

First Comparative Example

Figure 4:
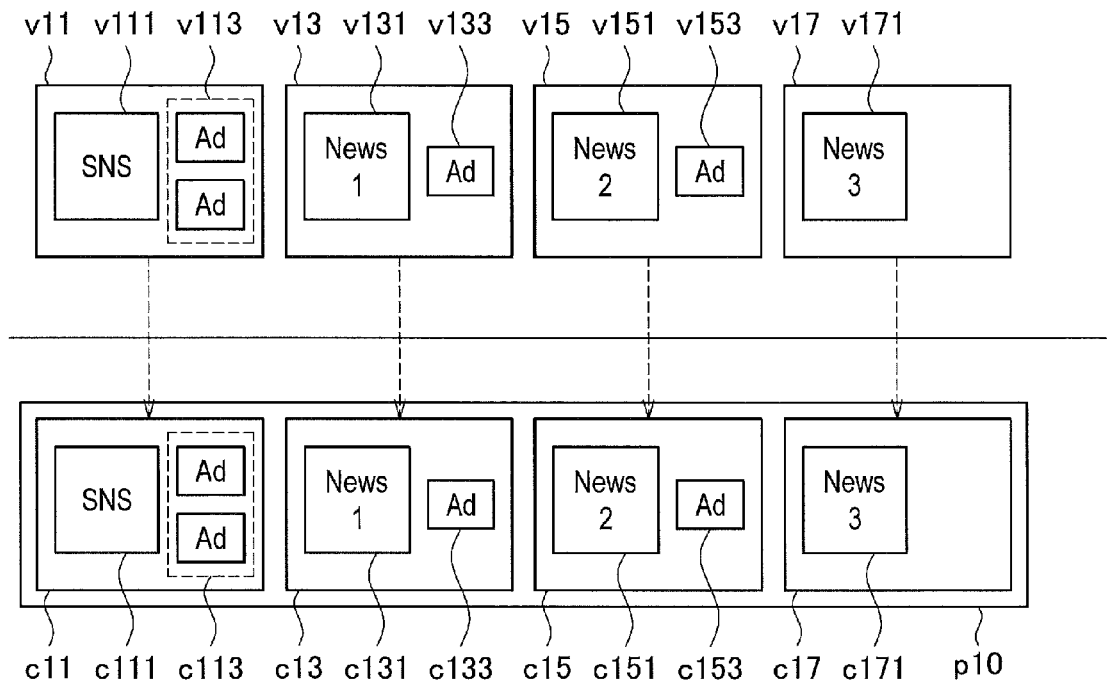
FIG. 4 is an explanatory diagram for describing an example of a process management method according to a first comparative example.

First, an example of a process management method according to a first comparative example will be described with reference to FIG. 4. FIG. 4 is an explanatory diagram for describing an example of a process management method according to the first comparative example. In FIG. 4, reference numerals v11 to v17 show examples of contents output to the display section 21 as each page. Note that, hereinafter, in order to easily understand the description, each of the contents v11 to v17 will correspond to one page (for example, a page managed in a window of a browser or in a tab unit), and each of the different contents output within these pages (for example, contents with different transmission sources (domains)) will be called sub-contents. That is, as shown in FIG. 4, an embodiment of the present disclosure will be described as outputting contents which include one or more sub-contents.

For example, in the example shown in FIG. 4, the content v11 includes sub-content v111 provided by an SNS, and sub-content v113 provided as an advertisement such as a Web advertisement. Specifically, the example shown in FIG. 4 shows an example of the case where a sub-frame, in which the sub-content v113 of an advertisement is output, is embedded in a part of a page in which a frame for outputting the sub-content v111 of an SNS is embedded.

Further, the contents v13, v15 and v17 respectively include sub-contents v131, v151 and v171 provided by news sites. Further, the contents v13 and v15 respectively include sub-contents v133 and v153 provided as advertisements such as Web advertisements.

Further, reference numerals c111 to c171 schematically show contexts of each of these sub-contents, such as data for outputting each of the sub-contents v111 to v171, or virtual objects (for example, DOM: Document Object Models) based on this data.

For example, the context c111 shows a context corresponding to the sub-content v111 provided by an SNS. Similarly, the context c113 shows a context corresponding to the sub-content v113 provided as an advertisement.

Note that, reference numerals c11 to c17 show which of each of the contexts c111 to c171 correspond to which of the sub-contents included in the contents, from among the contents v11 to v17. For example, the contexts c111 and c113 shown by the reference numeral c11 show that there is a correspondence to the sub-contents v111 and v113 included in the content v11.

The first comparative example shown in FIG. 4 shows an example of the case where processing related to an output of each of the sub-contents v111 to v171 is managed by a single process p10 (a single thread). That is, in the example shown in FIG. 4, processing related to an output of the sub-contents v111 to v171 is allocated to the process p10. In this case, the process p10 develops the contexts c111 to c171 corresponding to each of the sub-contents v111 to v171. Then, the process p10 controls an output of each of the sub-contents v111 to v171 based on these contexts.

Note that, while the present disclosure describes, as an example, the case where processing is executed for outputting each of the sub-contents by processes, it will also be the same for the contents which include these sub-contents. Note that, in the case where processing is executed for outputting contents, "sub-contents" may be arbitrarily changed to be read as "contents" in the description related to processing for each of the sub-contents.

By the single process p10 such as shown in FIG. 4, in the case where processing related to an output of a series of sub-contents is managed, and for example, in the case where processing related to an output of a part of the sub-contents has ended abnormally, it will often be the case that the process p10 will end processing. In such a case, in addition to the processing related to an output of the part of the sub-contents, processing related to an output of the other sub-contents will additionally end.

Further, since the process p10 manages processing related to an output of a series of sub-contents, for example, in the case where processing related to an output of a part of the sub-contents becomes non-responsive, it will often be the case that the overall processing of this process p10 becomes a state of a response waiting. In such a case, processing related to an output of the other sub-contents will additionally become a state of a response waiting, and there will be cases where the response related to an output of these sub-contents is considerably reduced.

Further, since processing related to an output of a series of sub-contents is managed by the single process p10, for example, in the case where a processor capable of performing parallel processing is applied, such as a multi-core processor, it will be difficult for processing related to an output of each of the contents to be performed in parallel.

Further, since the process p10 manages processing related to an output of a series of sub-contents, the respective contexts of this series of sub-contents becomes managed in a same memory space. Accordingly, for example, in the case where a vulnerability from the viewpoint of security is present in a part of the sub-contents, there will be the possibility that the other sub-contents will be exposed to a malicious attack, via the vulnerability of this sub-content.

Comparative Example 2

Figure 5:
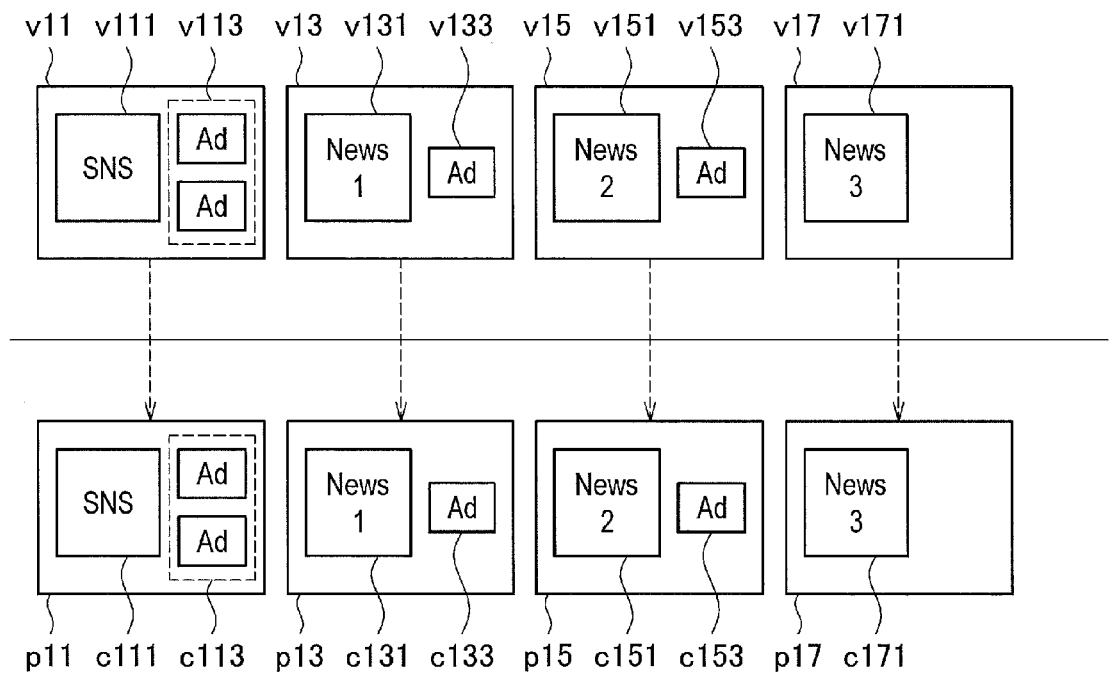
FIG. 5 is an explanatory diagram for describing an example of a process management method according to a second comparative example.

Next, an example of a process management method according to a second comparative example will be described with reference to FIG. 5. FIG. 5 is an explanatory diagram for describing an example of a process management method according to the second comparative example. The example shown in FIG. 5 shows an example of the case where each of the sub-contents of the contents v11 to v17 shown in FIG. 4 are respectively managed by being allocated to mutually different processes p11 to p17, for each of the contents.

As a specific example, the sub-contents v111 and v113 included in the content v11 are allocated to the process p11. That is, the process p11 develops the contexts c111 and c113 corresponding to each of the sub-contents v111 and v113, within a memory space managed by itself. Then, the process p11 controls an output of each of the sub-contents v111 and v113 based on these contexts.

Further, the sub-contents v131 and v133 included in the content v13 are allocated to the process p13. Similarly, the sub-contents v151 and v153 included in the content v15 are allocated to the process p15, and the sub-content v171 included in the content v17 is allocated to the process p17.

In this way, in the second comparative example shown in FIG. 5, each of the sub-contents of the contents v11 to v17 are managed by being allocated to different process for each of the contents. By such a configuration, for example, even in the case where a part of the processes becomes a state of an abnormal end or a response waiting, it becomes possible for the range of influence to be limited to only processing related to an output of the sub-contents allocated to this part of the processes. That is, in this case, it becomes possible for the other processes to continue processing related to an output of the sub-contents allocated to themselves, without receiving an influence of the operation (for example, an abnormal end or a response waiting) of this part of the processes.

As a specific example, in the case where processing related to an output of the sub-content v133 has ended abnormally, the process p13 ends processing. In this case, while there will be cases where processing related to an output of the sub-content v131 allocated to the process p13 additionally ends, processing related to an output of the sub-contents allocated to the other processes will continue.

On the other hand, in general, the capacity of memory used (in other words, the overhead of the capacity of memory to be used) tends to increase as the process number increases. That is, in the case where the process management method according to the second comparative example shown in FIG. 5 is applied, memory of a larger capacity will be used, compared to the case where the process management method according to the first comparative example shown in FIG. 4 is applied, as the number of pages (contents) to be output increases.

Further, as described previously, there will be cases where the maximum value of the number of processes capable of being managed at once by the information processing apparatus is determined depending on the management method of processes by an OS or the capacity of memory. Further, these processes will not be limited to being used for only a display of contents, and other processing managed by an OS can also be allocated. Accordingly, in the process management method according to the second comparative example shown in FIG. 5, in the case where a large amount of pages are opened, so that the number of processes to be operated at the same time exceeds a maximum number of processes capable of being managed by the information processing apparatus, there will be the possibility that the response of the information processing apparatus is considerably reduced. Specifically, in the case of the process management method according to the second comparative example, since the process number to be operated is determined in accordance with the number of contents (pages) to be output, regardless of the processing performance of the information processing apparatus, there will not be a small possibility that processes are generated, by exceeding the processing performance of this information processing apparatus.

Further, in the process management method according to the second comparative example, since the sub-contents included in these contents are allocated to processes for each of the contents (pages), for example, there will be cases where a plurality of sub-contents with different transmission sources are mutually allocated to a same process. In such a case, the contexts of each of the plurality of sub-contents with different transmission sources (in other words, different distribution sources) are mutually managed in a same memory space. Accordingly, in the case where a vulnerability from the viewpoint of security is present in a part of the sub-contents, from among the sub-contents allocated to a same process, there will be the possibility that the other sub-contents are exposed to a malicious attack, via the vulnerability of this sub-content.

1.3. Outline of the Process Management Method

Based on the above description, the information processing apparatus 10 according to the present embodiment provides a mechanism capable of more efficiently using resources for outputting contents including a plurality of sub-contents. Further, the information processing apparatus 10 according to the present embodiment improves security, for example, by managing resources so that sub-contents protected by a security function are protected from a malicious attack via another sub-content.

Figure 6:
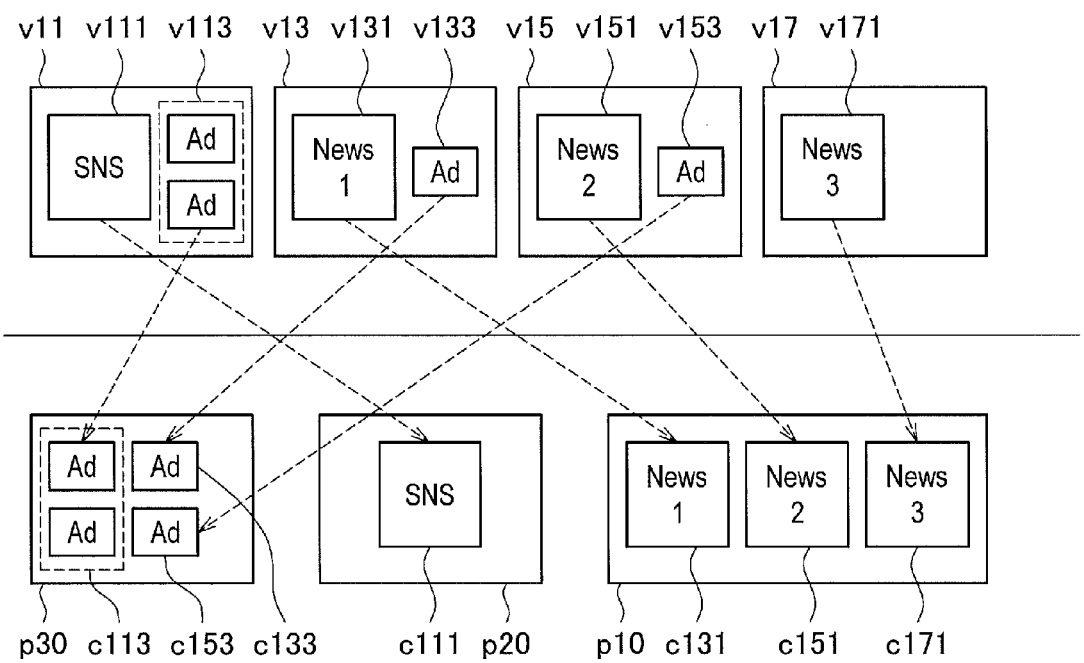
FIG. 6 is an explanatory diagram for describing an outline of process management by an information processing apparatus according to the embodiment.

Specifically, the information processing apparatus 10 according to the present embodiment classifies respective sub-contents included in each of the contents based on conditions determined in advance, and performs allocation to processes for each of the classifications. Hereinafter, an outline of process management by the information processing apparatus 10 according to the present embodiment will be described with reference to FIG. 6. FIG. 6 is an explanatory diagram for describing an outline of process management by the information processing apparatus 10 according to the present embodiment.

In the example shown in FIG. 6, the information processing apparatus 10 manages the contexts c111 to c171 of the sub-contents v111 to v171 included in each of the contents v11 to v17 by allocating each the contexts c111 to c171 to any one of the processes p10, p20 and p30.

At this time, for example, the information processing apparatus 10 allocates the sub-contents v131, v151 and v171 provided by news sites, and the sub-contents v113, v133 and v153 provided as advertisements, to mutually different processes. Specifically, in the example shown in FIG. 6, the information processing apparatus 10 allocates the sub-contents v131, v151 and v171 provided by news sites to the process p10, and allocates the sub-contents v113, v133 and v153 provided as advertisements to the process p30. In this way, the information processing apparatus 10 allocates the sub-contents provided as main contents by various types of sites such as news sites, and the sub-contents provided by distribution sources different to those of the main contents, such as Web advertisements or the like, to mutually different processes.

Note that, for example, it is possible for the sub-contents provided as main contents by various types of sites such as news sites, and the sub-contents provided by distribution sources different to those of the main contents such as so-called Web advertisements, to be distinguished based on the distribution sources (domains) of these sub-contents.

Further, for example, the information processing apparatus 10 allocates the sub-content v111 protected by a security function such as an authentication function, and the other sub-contents, to mutually different processes. Specifically, in the example shown in FIG. 6, the information processing apparatus 10 allocates the sub-content v111 to the process p20, and allocates the other sub-contents to any one of the processes p10 and p30.

Further, for example, it is possible to distinguish whether or not each of the sub-contents are protected by a security function, based on a communication protocol for distributing each of the sub-contents. Note that, a Secure Sockets Layer (SSL)/Transport Layer Security (TLS) protocol can be included as an example of a protocol for protecting security. Further, for example, Hypertext Transfer Protocol Secure (HTTPS) can be included as communication using a SSL/TLS protocol. Further, it is needless to say that this method will not be particularly limited if it can be determined whether or not each of the sub-contents are protected by a security function.

By such a configuration, for example, it becomes possible for the information processing apparatus 10 according to the present embodiment to control the number of processes for outputting each of the sub-contents, in accordance with the processing performance of itself. Accordingly, for example, even in the case where a comparatively large number of contents (for example, a large number compared to the case where contents are output to a small-sized display) are output, such as shown in FIG. 2 and FIG. 3, it becomes possible for the information processing apparatus 10 according to the present embodiment to prevent in advance the situation where processes exceeding the processing performance of itself are operated, and to suppress a reduction of the processing performance.

Further, the information processing apparatus 10 classifies the sub-contents included in each of the contents based on conditions determined in advance, and allocates each of the sub-contents to any one of the processes in accordance with this classification. In this way, each of the sub-contents and each of the processes are associated with each other.

By such a configuration, for example, it becomes possible for the information processing apparatus 10 to allocate sub-contents protected by a security function to processes different to those of other sub-contents. Accordingly, it becomes possible for the information processing apparatus 10 to protect sub-contents protected by a security function from a malicious attack via the other sub-content.

Further, the information processing apparatus 10 may allocate sub-contents with a large capacity of memory, which may be necessary for an output compared to that of other sub-contents, such as sub-contents which output images such as moving images, to processes different to those of the other sub-contents. Further, as another example, along with the execution of scripts within the sub-contents, the information processing apparatus 10 may allocate the sub-contents with a high exclusive frequency of a processor compared to that of other sub-contents (that is, the frequency at which scripts are executed is high) to processes different to those of the other sub-contents.

There will be cases where sub-contents with a large capacity of memory which may be necessary for an output, or sub-contents with a high exclusive frequency of a processor, have a frequency for stabilizing operations of the processes that is high compared to that of the other sub-contents, and as a result, have a high possibility of the processes ending abnormally. On the other hand, by the above described configuration, it becomes possible for the information processing apparatus 10 according to the present embodiment to stably output other sub-contents, by allocating sub-contents with a high possibility of the processes ending abnormally to processes different to those of the other sub-contents.

Heretofore, an outline of the information processing apparatus 10 according to the present embodiment has been described with reference to FIG. 6. Note that, hereinafter, the configuration and processing of the information processing apparatus 10 according to the present embodiment will be additionally described in detail.

1.4. Functional Configuration

An example of a functional configuration of the information processing apparatus 10 according to the present embodiment will be described. First, a schematic functional configuration of the information processing apparatus 10 according to the present embodiment will be described with reference to FIG. 7.

Figure 7:
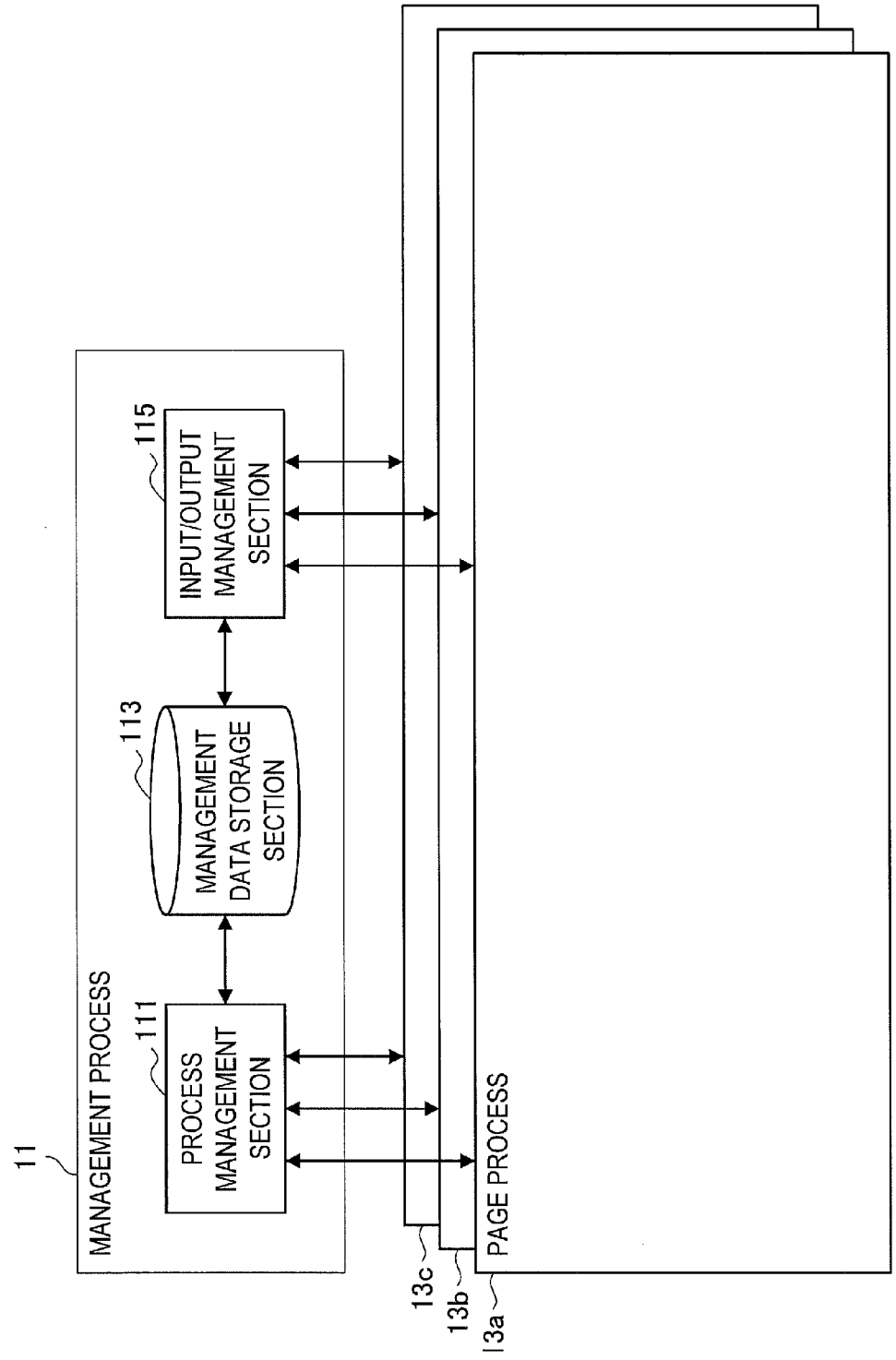
FIG. 7 describes a schematic functional configuration of the information processing apparatus 10 according to the embodiment.

As shown in FIG. 7, the information processing apparatus 10 according to the present embodiment includes a management process 11 and a plurality of page processes 13. The example shown in FIG. 7 shows the case where page processes 13a to 13c are included as the page processes 13. The management process 11 includes a process management section 111, a management data storage section 113 and an input/output management section 115.

The page processes 13 schematically show processes for executing processing related to a display of each of the sub-contents included within the contents. The page processes 13 correspond, for example, to the processes p10, p20 and p30 shown in FIG. 6.

The process management section 111 performs an allocation of the sub-contents to each of the generated page processes 13, with the generation and discarding of the page processes 13. The process management section 111 may control, for example, the number of page processes 13 to be operated, in accordance with performance information of the information processing apparatus 10. The capacity of memory loaded in the information processing apparatus 10, the empty capacity of this memory, the usage rate of a processor (for example, a CPU: Central Processing Unit) of this information processing apparatus 10 or the like can be included as performance information.

As a specific example, the process management section 111 may perform a control so that the maximum value of the number of page processes 13 to be generated increases as the memory capacity loaded in the information processing apparatus 10 increases. Further, in the case where the empty capacity of memory of the information processing apparatus 10 increases more than a prescribed value, the process management section 111 may additionally generate page processes 13, and in the case where the empty capacity of this memory becomes less than the prescribed value, the process management section 111 may discard a part of the page processes 13 which are not used.

Further, the process management section 111 classifies the sub-contents included in each of the contents based on prescribed conditions, and allocates each of the sub-contents to any one of the page processes 13 to be operated, based on this result of classification. Further, the process management section 111 records information, which shows which of each of the sub-contents are allocated to which of the page processes 13, to the management data storage section 113 as management information.

Note that, by such a configuration, there will be cases where a content which includes a plurality of sub-contents (hereinafter, called a "parent content"), and this plurality of sub-contents, are allocated to mutually different page processes 13.

Accordingly, the input/output management section 115 controls the input and output of information between the parent content and each of the sub-contents (for example, event processing or the like based on a user operation) based on management information stored in the management data storage section 113.

For example, an operation is performed for a screen on which contents are displayed for a user. At this time, the input/output management section 115 specifies a sub-content (page) which becomes a target of an operation based on the operation details of the user, and specifies the process to which this sub-content has been allocated based on management information stored in the management data storage section 113. Then, the input/output management section 115 notifies information (event information) showing the operation details of the user to the specified process.

Further, the input/output management section 115 acquires a drawing result of each of the sub-contents, from each of the page processes, and outputs these drawing results to the display section 21 of the display device 20 as a display screen.

Note that, each of the structural elements of the management process 11 (that is, the process management section 111, the management data storage section 113 and the input/output management section 115), and the details of the page processes 13, will be separately described later.

Further, it is possible for communication between the management process 11 and the page processes 13, and between mutually different page processes 13, to be implemented, for example, based on communication between processes provided as functions by an OS. Further, it is needless to say that the method which transmits and receives information between the management process 11 and the page processes 13, or between mutually different page processes 13, will not be particularly limited if it can transmit and receive information between different processes.

Figure 8:
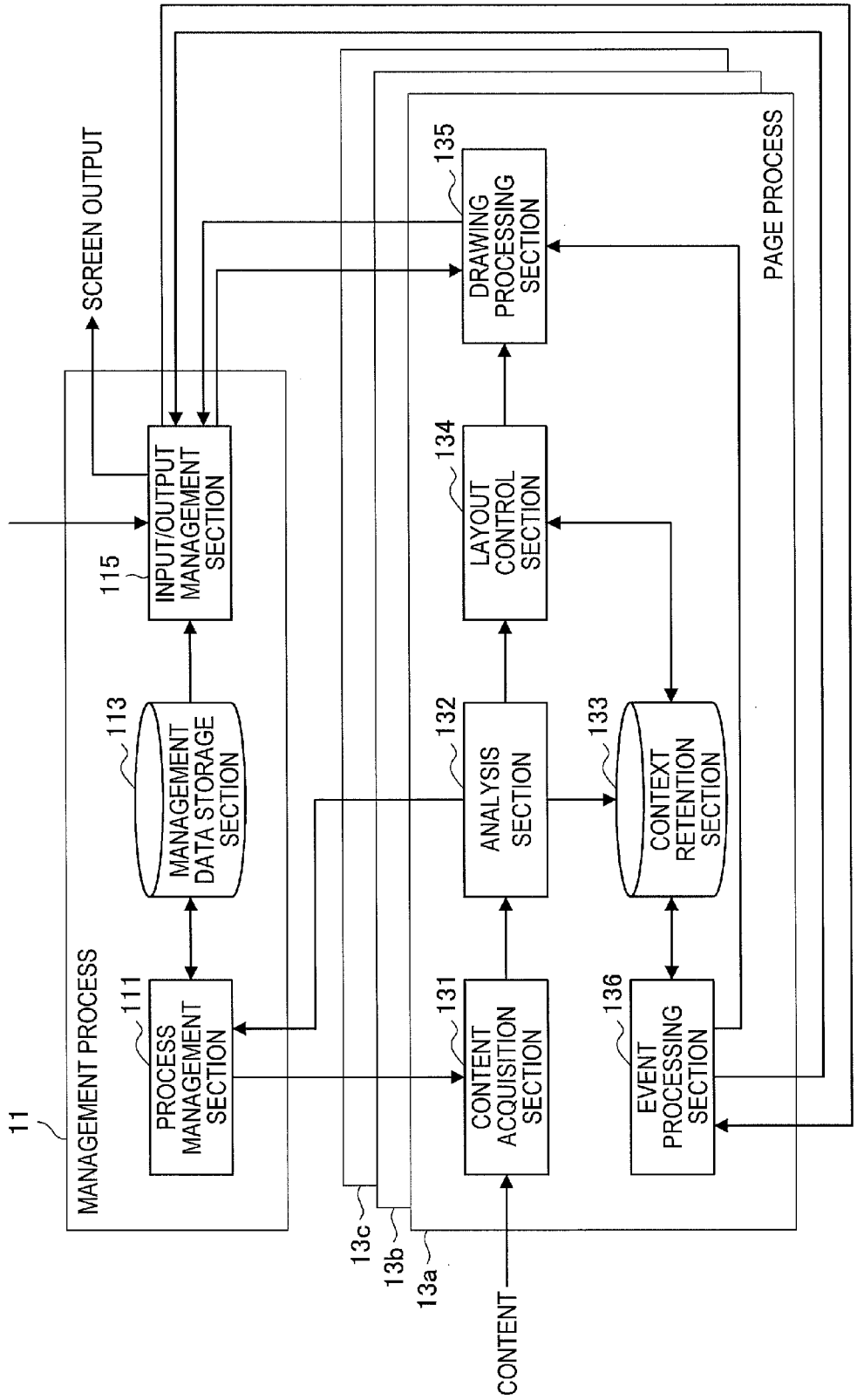
FIG. 8 is a block diagram which shows an example of a functional configuration of the information processing apparatus according to the embodiment.

Next, an example of a functional configuration of the information processing apparatus 10 according to the present embodiment will be described with reference to FIG. 8. FIG. 8 is a block diagram which shows an example of a functional configuration of the information processing apparatus 10 according to the present embodiment. Specifically, FIG. 8 shows in detail an example of a functional configuration of the page processes 13.

As shown in FIG. 8, the page processes 13 include a content acquisition section 131, an analysis section 132, a context retention section 133, a layout control section 134, a drawing processing section 135, and an event processing section 136.

Note that, hereinafter, in order to easily understand the operations of the information processing apparatus 10 according to the present embodiment, the details of each of the structural elements of the management process 11, and the details of each of the structural elements of the page processes 13, will be described by separating into the three processing triggers of "1.4.1. Classification of sub-contents", "1.4.2. Allocation of sub-contents to processes", and "1.4.3. Processes based on an input event".

<<1.4.1. Classification of Sub-Contents>>

Figure 9:
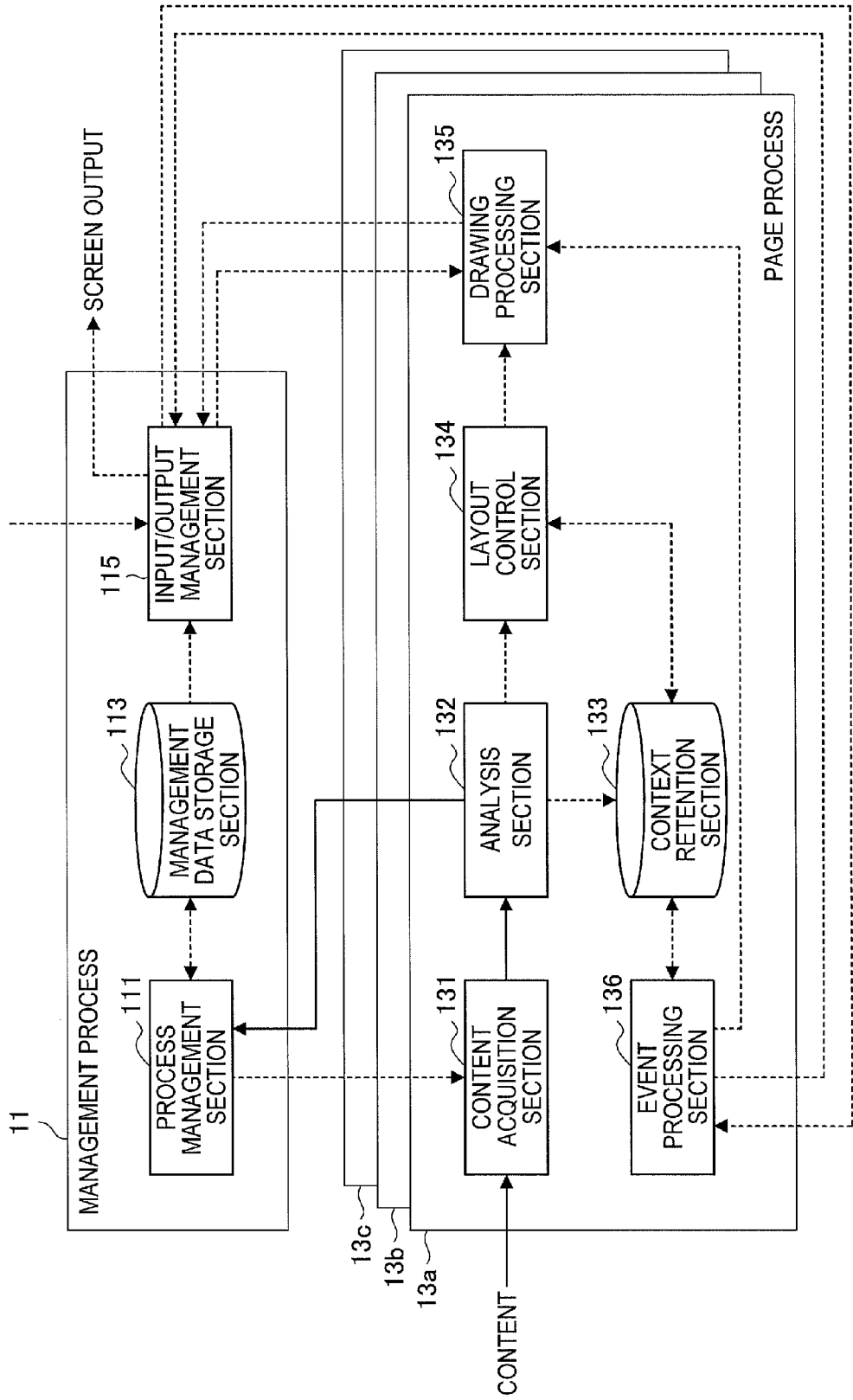
FIG. 9 is an explanatory diagram for describing the functions operating when the information processing apparatus classifies sub-contents included in an acquired content.

First, by focusing on processing in which the information processing apparatus 10 acquires a content distributed from the server 90, and classifies sub-contents included in this content for allocating to each of the page processes 13, a configuration which operates at the time of this processing will be described with reference to FIG. 9. FIG. 9 is an explanatory diagram for describing the functions operating when the information processing apparatus 10 classifies sub-contents included in an acquired content. Note that, in FIG. 9, the flow of information, from within the block diagram shown in FIG. 8, when the information processing apparatus 10 acquires a content and classifies the sub-contents included in this acquired content is shown by solid lines, and the flow of information other than this is shown by dotted lines.

First, when a content is distributed from the server 90, this content is acquired by the content acquisition section 131 of the page processes 13. At this time, the page process 13 which initially acquires the content may be arbitrarily set in accordance with the use or the configuration of the browser. For example, a prescribed page process 13 may acquire the content. Further, as another example, the process management section 111 may select any one out of each of the page processes 13 (for example, the page process 13 with a low processing load), and may cause this page process 13 to acquire the content. In an embodiment of the present disclosure, the content acquisition section 131 of the page process 13a will be described as acquiring the content from the server 90.

The content acquisition section 131 accesses, for example, a distribution source based on information of this distribution source specified based on a user operation (for example, a URL: Uniform Resource Locator), and acquires the content from this distribution source.

Figure 10:
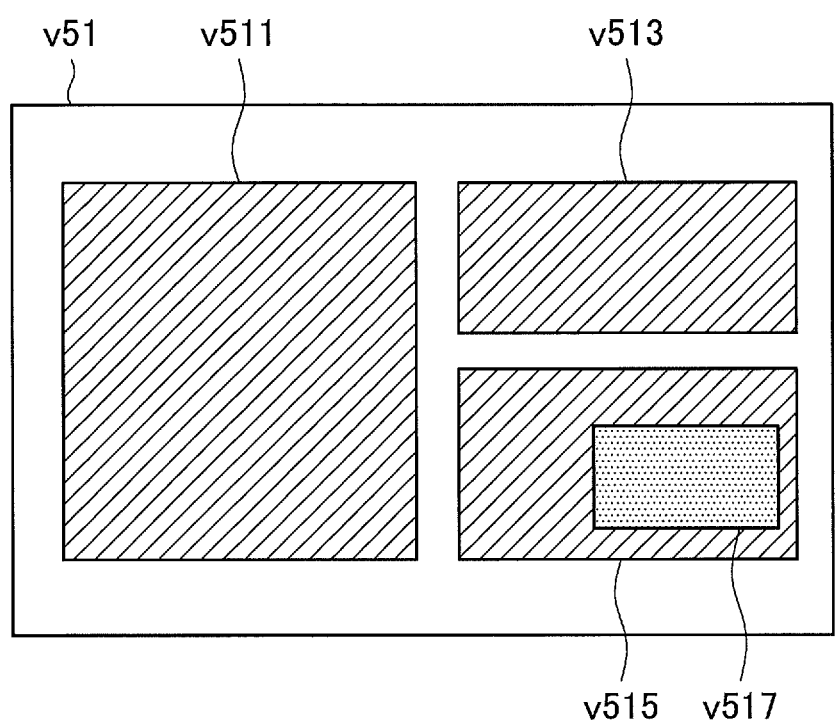
FIG. 10 is a figure which schematically shows an example of an acquired content.

Note that, in an embodiment of the present disclosure, the content acquisition section 131 will be described as acquiring content v51 such as shown in FIG. 10. FIG. 10 is an explanatory diagram for describing operations of the information processing apparatus 10 according to the present embodiment, and schematically shows an example of an acquired content. That is, the content acquisition section 131 acquires the content v51 which includes sub-contents v511, v513, v515 and v517.

The content acquisition section 131 outputs the acquired content v51 to the analysis section 132.

The analysis section 132 acquires the content v51 from the content acquisition section 131. The analysis section 132 extracts information of the sub-contents v511, v513, v515 and v517 from the content v51, by analyzing the details of the content v51.

As a specific example, the content v51 is described by a markup language such as HyperText Markup Language (HTML), Standard Generalized Markup Language (SGML) or Extensible Markup Language (XML). In this case, for example, the analysis section 132 performs syntax analysis and phase analysis for the details of the content v51, and generates contexts such as objects (for example, DOM) by structuralizing each of the sub-contents included within the content v51, based on this analysis result. Then, the analysis section 132 may extract information of the sub-contents v511, v513 and v514 from these generated contexts.

Figure 11:
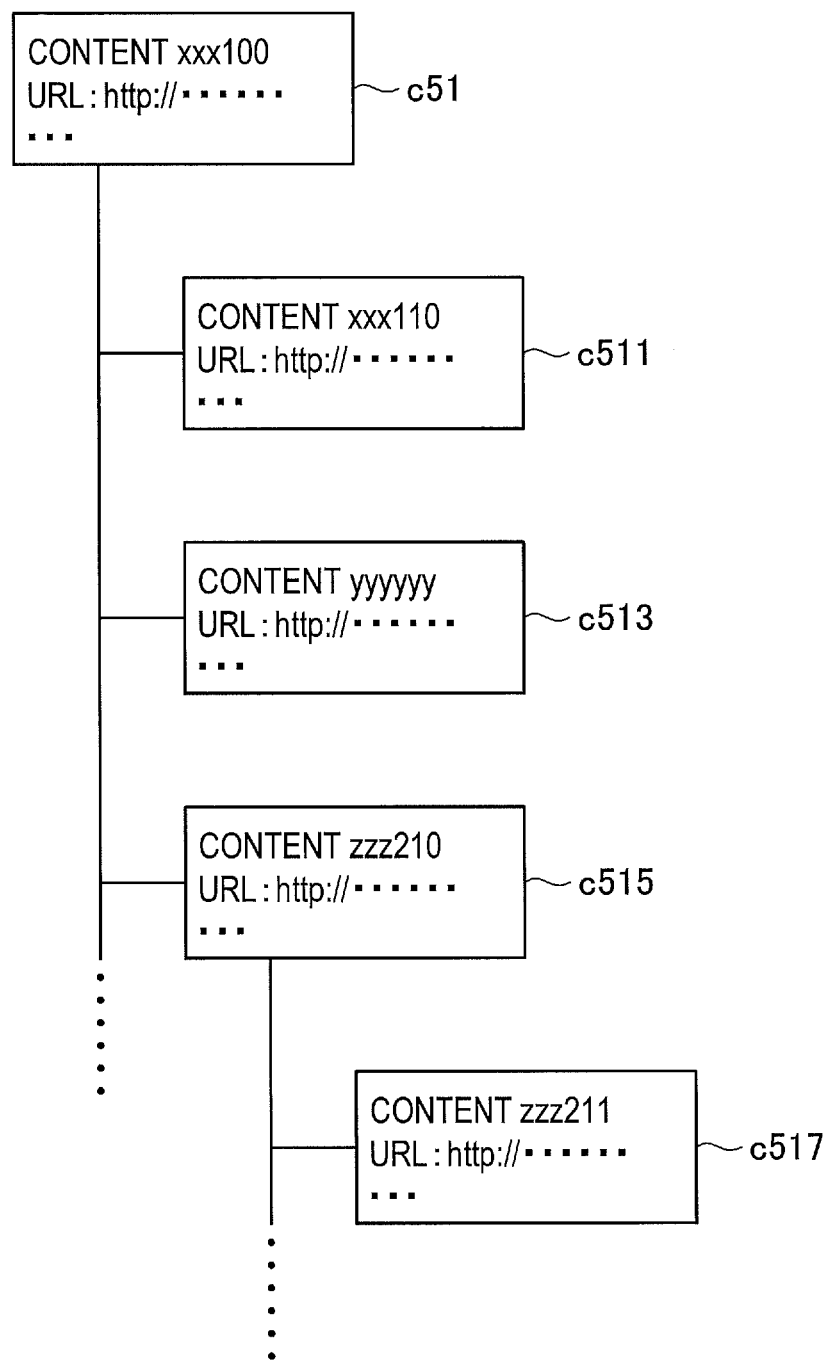
FIG. 11 is an example of contexts (objects) generated based on an analysis result of the content shown in FIG. 10.

For example, FIG. 11 schematically shows an example of contexts (objects) generated based on an analysis result of the content shown in FIG. 10. In FIG. 11, reference numeral c51 shows an example of a context of the content v51 shown in FIG. 10. Further, reference numerals c511, c513, c515 and c517 respectively show examples of contexts of the sub-contents v511, v513, v515 and v517 shown in FIG. 10.

For example, in the example shown in FIG. 10, v511, v513 and v515 are included in the content v51. Accordingly, in the example shown in FIG. 11, the context c51 is set to a parent node, and the contexts c511, c513 and c515 of the sub-contents v511, v513 and v515 are associated as child nodes of the context c51.

Further, another sub-content may be included within a part of a sub-content, such as the sub-contents v515 and v517 shown in FIG. 10. In this case, the context c515 is set to a parent node, and the context c517 of the sub-content v517 is associated as a child node of the context c515.

Note that, each of the contexts retain meta information (for example, a URL or the like) related to the sub-contents corresponding to these contexts as attribute information.

As described above, the analysis section 132 generates a context of this content v51 by analyzing the content v51, and extracts meta information related to the sub-contents v511, v513, v515 and v517 based on the generated context. Note that, the acquisition source of each of the sub-contents such as a URL, the data type of information included in each of the sub-contents (for example, information which shows a still image, a moving image or the like) or the like can be included as meta information.

Then, the analysis section 132 outputs the meta information extracted from the respective contexts of each of the sub-contents included in the content v51 to the process management section 111, for each of these sub-contents. Note that, the process management section 111 classifies each of the sub-contents included in the content v51, based on information (for example, meta information) extracted for each of the sub-contents from the analysis section 132. Accordingly, the analysis section 132 may examine the information to be notified to this process management section 111, in accordance with the processing details of the process management section 111.

Further, the analysis section 132 may also notify meta information extracted from the context of the content v51 which includes each of the sub-contents to the process management section 111, similarly for each of the sub-contents. By such a configuration, it becomes possible for the process management section 111 to classify the content v51 the same as the other sub-contents. Note that, hereinafter, in order to easily understand the description, a description will be made by mainly focusing on the case where a sub-content is a target of processing.

Further, the information to be notified to the process management section 111 for each of the sub-contents will not necessarily be limited to meta information included in each of the contexts, if the analysis section 132 has information related to sub-contents capable of being acquired based on an analysis result for the content v51. For example, the analysis section 132 may output information capable of being specified based on the code of a script included in each of the sub-contents (for example, the code amount of a script, the presence or not of a loop process or the like) to the process management section 111.

Note that, hereinafter, in order to easily understand the description, the analysis section 132 will be described as outputting meta information included in the contexts of each of these sub-contents, as information related to each of the sub-contents. Further, hereinafter, there will be cases where the meta information included in the contexts of each of the sub-contents is simply described as "meta information of each of the contents".

The process management section 111 acquires meta information of each of the sub-contents included in the content v51 from the analysis section 132 for each of the sub-contents. Then, the process management section 111 sets the acquired meta information as input information, and classifies each of the sub-contents based on conditions determined in advance.

For example, the process management section 111 may classify each of the sub-contents for each of the distribution sources, based on URLs showing the distribution sources of each of the sub-contents presented as meta information. Further, the process management section 111 may determine whether or not these sub-contents are sub-contents provided by distribution sources different to that of the main content, such as Web advertisements or the like, based on URLs showing the distribution sources of the sub-contents, and may classify each of the sub-contents based on this determination result. As a specific example, the process management section 111 may store in advance the URLs of sites which distribute sub-contents provided as advertisements as a list, and may determine whether or not each of the sub-contents are sub-contents provided as advertisements, based on this list.

Further, as another example, the process management section 111 may determine whether or not these sub-contents are sub-contents protected by a security function, based on a communication protocol for distributing each of the sub-contents, and may classify each of the sub-contents based on a result of this determination. As a specific example, the process management section 111 may specify a communication protocol for distributing these sub-contents, based on URLs showing the distribution sources of the sub-contents. Further, the process management section 111 may specify a communication protocol for distributing the sub-contents based on other meta information, not limited to that of URLs of the distribution sources.

Further, as another example, the process management section 111 may classify each of the sub-contents, based on the type of each of the sub-contents shown in the meta information. As a specific example, the process management section 111 may separately classify sub-contents with a large capacity of memory, which may be necessary for an output compared to that of other types (for example, character information) such as a moving image or the like, and sub-contents of types other than this.

Note that, the above described classification method of each of the sub-contents is merely an example, and is not limited to the method shown above. A method which classifies each of the sub-contents, by the process management section 111, will be separately described in detail later.

As described above, the information processing apparatus 10 acquires a content distributed from the server 90, and classifies sub-contents included in this content based on conditions determined in advance.

<<1.4.2. Allocation of Sub-Contents to Processes>>

Figure 12:
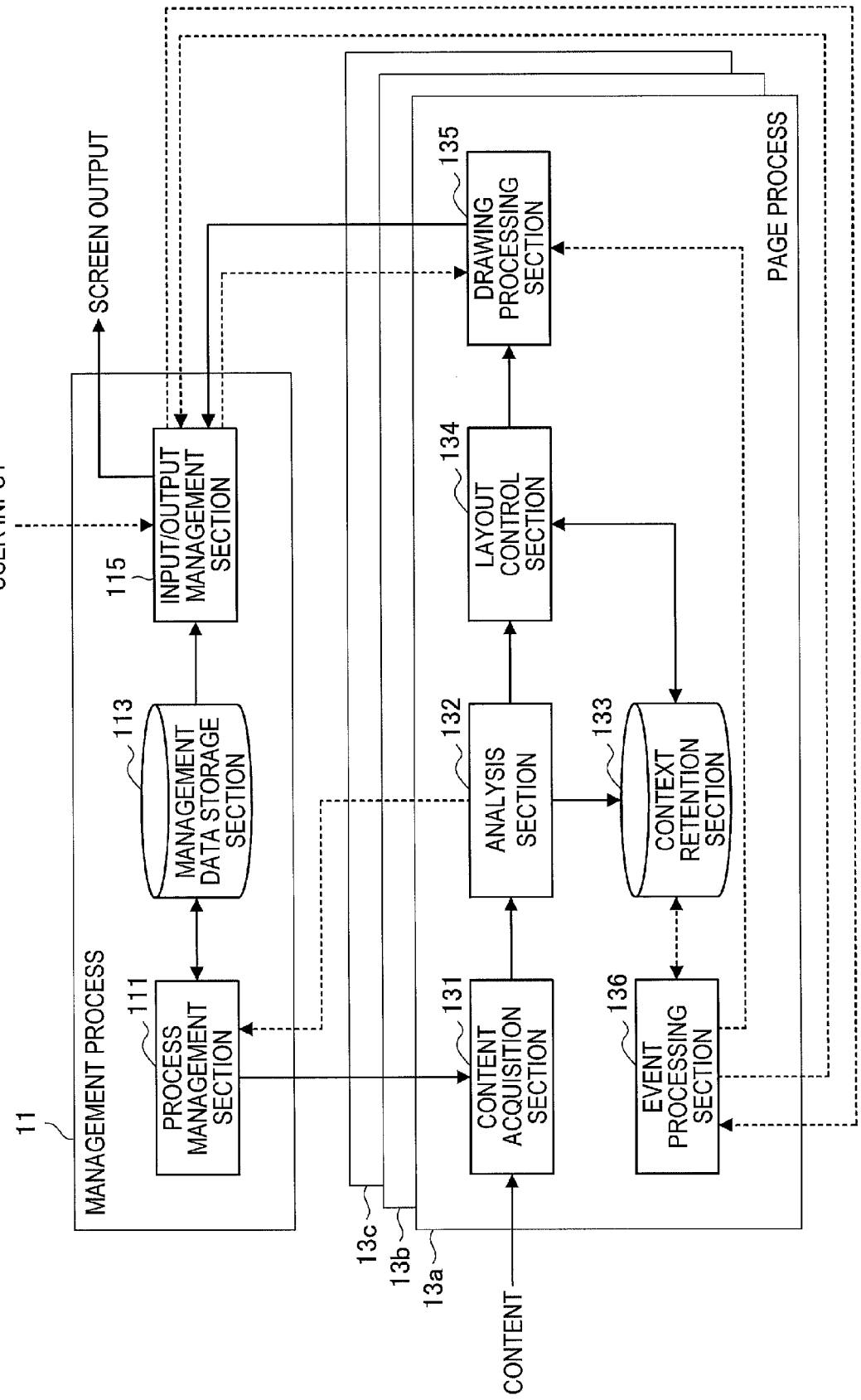
FIG. 12 is an explanatory diagram for describing the functions operating when the information processing apparatus allocates each of the classified sub-contents to each page process.

Next, by focusing on processing in which the information processing apparatus 10 allocates each of the classified sub-contents to each of the page processes 13, and each of the page processes 13 outputs the allocated sub-contents, a configuration which operates at the time of this processing will be described with reference to FIG. 12. FIG. 12 is an explanatory diagram for describing the functions operating when the information processing apparatus 10 allocates each of the classified sub-contents to each of the page processes 13. Note that, in FIG. 12, the flow of information, from within the block diagram shown in FIG. 8, when the information processing apparatus 10 allocates sub-contents to the page processes 13 and the details of these sub-contents are output to these page processes 13 is shown by solid lines, and the flow of information other than this is shown by dotted lines.

When each of the sub-contents are classified based on conditions determined in advance, the process management section 111 allocates each of the sub-contents to any one of the page processes 13 to be operated (for example, the page processes 13a to 13b), in accordance with a result of this classification.

As a specific example, the process management section 111 mutually allocates sub-contents provided by distribution sources different to that of the main content, such as Web advertisements or the like, to a same page process 13. Further, as another example, the process management section 111 may allocate sub-contents protected by a security function to page processes 13 different to those of other sub-contents.

Further, the process management section 111 may newly start page processes 13, and may allocate each of the sub-contents to these started page processes 13.

Further, in the case where a plurality of candidates of the page processes 13 for allocating the sub-contents of some classification are present, the process management section 111 may determine the page processes 13 which become allocation sources of the sub-contents, based on conditions determined in advance.

As a specific example, the process management section 111 may weight each of these page processes 13, in accordance with the number of sub-contents already allocated to each of the page processes 13, and may determine the page processes 13 to which the sub-contents are to be newly allocated, in accordance with the weighting. For example, the process management section 111 may preferentially and newly allocate sub-contents to the page processes 13 in which a number of allocated sub-contents is low.

Note that, as shown above, the method in which the process management section 111 allocates each of the sub-contents to each of the page processes 13 is merely an example, and these details are not limited to the example shown above. The method in which the process management section 111 allocates each of the sub-contents to each of the page processes 13 will be separately described in detail later, by including other examples.

As described above, the process management section 111 allocates these sub-contents to any one of the page processes 13, in accordance with a result for classifying each of the sub-contents. Then, the process management section 111 records a corresponding relationship between each of the sub contents and the page processes 13 to which these sub-contents are allocated to management information d10 stored in the management data storage section 113.

For example, FIG. 13 shows an example of management information d10 stored in the management data storage section 113. As shown in FIG. 13, for example, the management information includes meta information d11 and a page process d13. The meta information d11 shows information capable of identifying these sub-contents, from among information extracted from the contexts of each of the sub-contents. URLs of the sub-contents can be included, for example, as the meta information d11. Further, the page process d13 shows the page processes 13 to which the sub-contents shown by the meta information d11 are allocated. Note that, for example, process numbers or the like for managing each of the processes by an OS can be included as information managed as the page process d13. Note that, for example, it is possible for process numbers to be acquired by using a system call of an OS.

As shown in FIG. 13, the management information d10 stored in the management data storage section 113 is information for managing a corresponding relationship between the sub-contents and the page processes 13 to which these sub-contents are allocated. Note that, the configuration of the management information d10 shown in FIG. 13 is merely an example, and this configuration will not be particularly limited if it can manage the corresponding relationship between the sub-contents and the page processes 13. For example, the management information d10 may include meta information of sub-contents other than URLs.

Further, the process management section 111 notifies meta information (for example, URLs) for acquiring these sub-contents to the page processes 13 to which the sub-contents are allocated, and instructs an output of these sub-contents to these page processes 13. Accordingly, hereinafter, the process management section 111 will be described as instructing an output of the sub-content v515 shown in FIG. 10 to the page process 13b.

The content acquisition section 131 of the page process 13b acquires meta information for acquiring the sub-content v515 from the process management section 111. The content acquisition section 131 accesses the server 90 based on the acquired meta information, and acquires the sub-content v515.

The content acquisition section 131 outputs the acquired sub-content v515 to the analysis section 132.

The analysis section 132 acquires the sub-content v515 from the content acquisition section 131. The analysis section 132 generates a context c515 of this sub-content v515, by analyzing the details of the sub-content v515. Then, the analysis section 132 causes the generated context c515 to be retained in the context retention section 133.

The context retention section 133 is a retention section for retaining contexts of the sub-contents allocated to the page processes 13 in order for each of the functions within these page processes 13 to be referred to (for example, a layout control section 134 or an event processing section 136).

Note that, information for outputting the sub-content v517 within the sub-content v515, such as an output position or the like within this sub-content v515, of the sub-content v517 included within the sub-content v515 is included in the generated context c515. On the other hand, it may not be necessary for the context of the sub-content v517 itself to be included within the context c515. For example, in the case where the sub-content v517 is allocated to the page process 13c, this sub-content v517 will be retained by this page process 13c.

When the generation of the context c515 by the analysis section 132 is completed, the layout control section 134 adjusts the layout for displaying the sub-content v515 as a screen, based on the context c515 retained in the context retention section 133.

Specifically, the layout control section 134 adjusts the layout, by adjusting the display position or size of each of the components within the sub-content v515 based on meta information (for example, information showing the display position or size) of objects showing these components. Note that, components indicate the parts (for example, icons or the like) constituting a screen of a sub-content, and information for outputting these components is included in the context.

Further, for example, the layout control section 134 may acquire information for displaying a content or each of the contents, such as a window size of a browser, by using a system call or the like of an OS, and may adjust the layout based on the acquired information.

When the adjustment of the layout is completed, the layout control section 134 adds or updates information (information such as a display position or size) of each of the components included within the context c515 retained in the context retention section 133, based on an adjustment result of the layout.

Further, the layout control section 134 outputs the context c515 updated based on the adjustment result of the layout to the drawing processing section 135.

The drawing processing section 135 acquires the context c515 from the layout control section 134, and draws a screen of the sub-content v515, based on the acquired context c515. Specifically, the drawing processing section 135 generates a screen of the sub-content v515, by arranging each of the components included in the sub-content v515 based on information of these components included in the context c515. Then, the drawing processing section 135 generates an image presented by this screen (hereinafter, there will be cases where this is simply called a "screen"), by drawing the generated screen of the sub-content v515.

Note that, there will be cases where a screen of the sub-content v517 included in the sub-content v515 is generated by a page process 13 different to the page process 13b. In this case, the drawing processing section 135 acquires a drawing result (screen) of this sub-content v517, from the page process 13 to which the sub-content v517 is allocated, via the input/output management section 115, which will be described later. Then, the drawing processing section 135 may arrange the acquired drawing result of the sub-content v517 in a region for outputting this sub-content v517 within the sub-content v515.

The drawing processing section 135 outputs the generated screen of the sub-content v515 to the input/output management section 115.

Next, processing of the input/output management section 115 will be additionally described with the operations of the drawing processing section 135. Here, a description will be made, as an example, for the case where the input/output management section 115 causes the screen of the content v51 shown in FIG. 10 to be displayed on the display section 21 of the display device 20.

For example, while the page process 13 to which the content v51 is allocated (here, set as the page process 13a) draws a screen of the content v51, it is not necessarily limited to performing drawing of the sub-contents v511, v513 and v515 included within the content v51. Accordingly, in such a case, the input/output management section 115 acquires a drawing result of the sub-contents v511, v513 and v515 from each of the page processes 13, and outputs the acquired drawing results to the page process 13a to which the content v51 is allocated. In this way, it becomes possible for the page process 13a to draw a screen of the content v51 in which the drawing results of the sub-contents v511, v513 and v515 are embedded. Accordingly, hereinafter, the specific details of the present operations will be described, as an example, for the case where an output result of the sub-content v515 is embedded within the content v51.

For example, the drawing processing section 135 of the page process 13a to which the content v51 is allocated specifies the sub-content v515 included in the content v51 based on the context of this content v51. Then, the drawing processing section 135 extracts meta information for specifying the sub-content v515 from the context of the content v51.

The drawing processing section 135 notifies the extracted meta information of the sub-content v515 to the input/output management section 115, and requests an output of the drawing result of this sub-content v515.

When a request related to an output of the drawing result of the sub-content v515 is received, the input/output management section 115 specifies the page process 13 to which the sub-content v515 is allocated, by referring to the meta information additionally notified and the management information d10 stored in the management data storage section 113.

As a specific example, the input/output management section 115 acquires a URL shown by "http://www.zzz . . . zzz210" as meta information of the sub-content v515. In this case, for example, the input/output management section 115 recognizes that the sub-content v515 is allocated to the page process 13b shown by "0013b", based on the management information d10 shown in FIG. 13.

In this case, the input/output management section 115 requests an output of the drawing result of the sub-content v515 to the page process 13b, and in response to this, acquires the drawing result of the sub-content v515 from this page process 13b. Then, the input/output management section 115 outputs the acquired drawing result of the sub-content v515 to the page process 13a to which the content v51 is allocated, which is a request source. Note that, it is needless to say that, in the case where a drawing result of the sub-content v515 has already been acquired from the page process 13b, the input/output management section 115 will not necessarily request an output of the drawing result to the page process 13b.

When the drawing result of the sub-content v515 is acquired from the input/output management section 115, the drawing processing section 135 of the page process 13a embeds this drawing result in the content v51, and draws a screen of this content v51. Then, the drawing processing section 135 outputs the screen of the content v51, in which the drawing result of the sub-content v515 is embedded, to the input/output management section 115.

The input/output management section 115 acquires the screen (drawing result) of the content v51 from the drawing processing section 135 of the page process 13*a*, and causes the acquired screen to be displayed on the display section 21 of the display device 20. In this way, the screen of the content v51, in which the sub-content v515 is embedded, is displayed on the display section 21.

Note that, in the example shown above, while an example has been described in which the input/output management section 115 mediates the transmission and reception of information (for example, a drawing result of a sub-content) between the plurality of page processes 13, direct information may be transmitted and received between the page processes 13. In this case, the input/output management section 115 notifies a corresponding relationship between the sub-content which becomes a target and the page process 13, for each of the page processes 13, and these page process 13 may perform transmission and reception of information with other corresponding page processes 13, based on the notified information. Note that, for example, transmission and reception of information between the page processes 13 can be executed based on communication between processes provided as functions by an OS, such as previously described.

<<1.4.3. Processing Based on an Input Event>>

Figure 14:
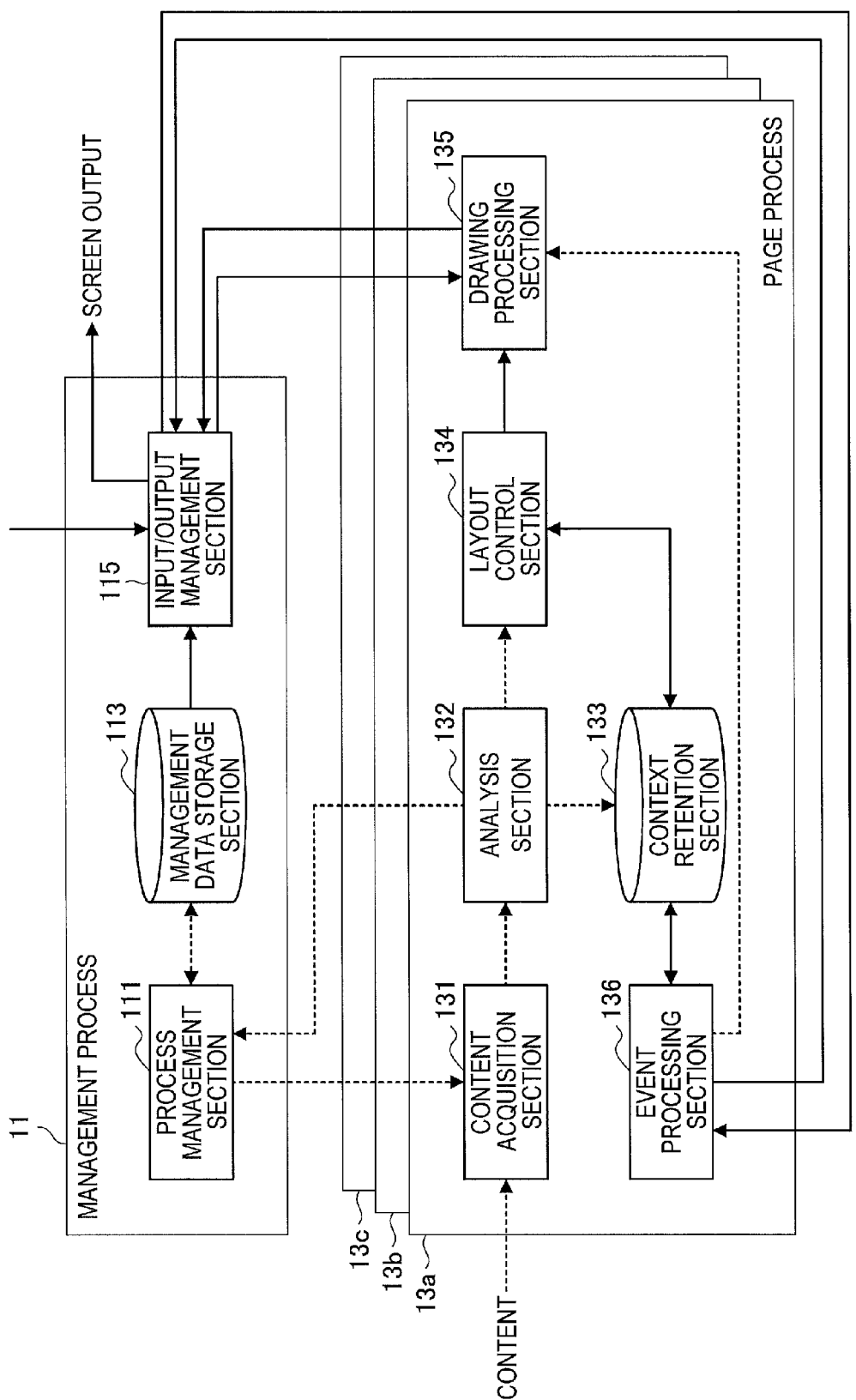
FIG. 14 is an explanatory diagram for describing the functions operating when the information processing apparatus updates details of a sub-content based on a user input.

Next, by focusing on processing in which the information processing apparatus 10 specifies a sub-content which becomes a target of an operation, based on a user input, and updates the details of the specified sub-content, a configuration which operates at the time of this processing will be described with reference to FIG. 14. FIG. 14 is an explanatory diagram for describing the functions operating when the information processing apparatus 10 updates the details of a sub-content based on a user input. Note that, in FIG. 14, the flow of information, from within the block diagram shown in FIG. 8, when the information processing apparatus 10 updates the details of a sub-content, based on a user input, is shown by solid lines, and the flow of information other than this is shown by dotted lines. Further, in an embodiment of the present disclosure, a description will be made in which a user performs an operation for the content v51 shown in FIG. 10.

When an operation of a user is received accepted for the content v51 displayed on a browser, the input/output management section 115 specifies a content which becomes an operation target, based on the operation details of this user. As a specific example, the input/output management section 115 specifies a content which becomes an operation target, based on information of a component focused on at the time when the user performs an operation, and the position on the screen at which the user performs the operation. In the present embodiment, the input/output management section 115 recognizes that an operation has been performed for the content v51, such as previously described.

The input/output management section 115 specifies the page process 13 to which the content v51 which becomes an operation target is allocated based on the management information d10 stored in the management data storage section 113. Here, the input/output management section 115 specifies "page process 13*a*" as the page process 13 to which the content v51 is allocated.

The input/output management section 115 notifies control information, which shows the operation details (for example, the position of the operation target or the type of operation) by the user, as an input event, to the event processing section 136 of the specified page process 13*a*.

When the input event is acquired from the input/output management section 115, the event processing section 136 refers to a context retained in the context retention section 133, and specifies a component which becomes an operation target. As a specific example, the event processing section 136 specifies a component which becomes a target of this operation, based on information showing the position of the operation target, which is notified as the input event.

Then, in the case where a context corresponding to the component which becomes a target is retained in the context retention section 133, the event processing section 136 updates the context of the component which becomes a target, based on the type of operation notified as the input event.

Note that, the processes after the context is updated are similar to the previously described processes related to the drawing of the content (sub-content). That is, the layout control section 134 reads the context after being updated from the context retention section 133, and outputs the read context to the drawing processing section 135. Then, the drawing processing section 135 draws a screen of the content v51 based on this context and outputs the drawn screen to the input/output management section 115. The input/output management section 115 acquires the updated screen of the content v51 from the drawing processing section 135 of the page process 13*a*, and causes the acquired screen to be output to the display section 21. By such a configuration, the screen of the content v51 updated based on a user input is output to the display section 21.

Figure 15:
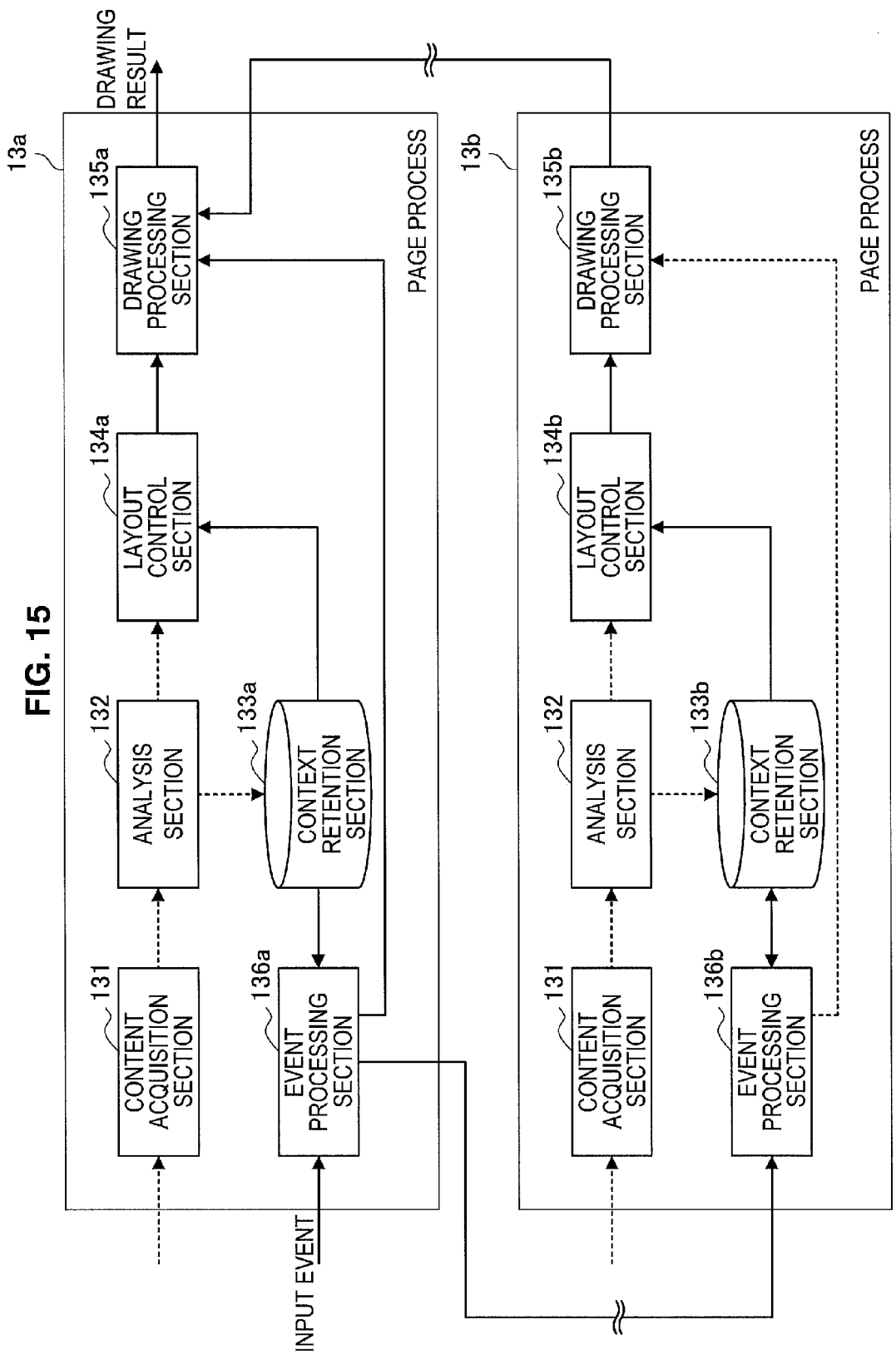
FIG. 15 is an explanatory diagram for describing the functions operating when the information processing apparatus updates details of a sub-content based on a user input.

On the other hand, there will be cases where the content v51 (refer to FIG. 10), and the sub-content v515 within this content v51, are allocated to mutually different page processes 13. Accordingly, an example of the operations of the information processing apparatus 10 will be described hereinafter with reference to FIG. 15, in the case where the content v51 and the sub-content v515 are allocated to mutually different page processes 13, and in the case where an operation is performed for the sub-content v515. FIG. 15 is an explanatory diagram for describing the functions operating when the information processing apparatus 10 updates the details of a sub-content based on a user input, and shows the flow of information of the case where the content and the sub-content are allocated to mutually different page processes 13.

Note that, in FIG. 15, the flow of information, from within the block diagram shown in FIG. 8, when the information processing apparatus 10 updates the details of a sub-content, based on a user input, is shown by solid lines, and the flow of information other than this is shown by dotted lines. Further, in the example shown in FIG. 15, the page process 13*a* shows the page process 13 to which the content v51 is allocated, and the page process 13*b* shows the page process 13 to which the sub-content v515 is allocated. Further, in FIG. 15, in order to easily understand the description, an illustration for each of the structural elements of the management process 11, from among each of the structural elements shown in FIG. 8, will be omitted.

Further, there will be cases where the context retention section 133, the layout control section 134, the drawing processing section 135 and the event processing section 136 in the page process 13*a* are described as a "context retention section 133*a*", a "layout control section 134*a*", a "drawing processing section 135*a*" and an "event processing section 136*a*". Similarly, there will be cases where the context retention section 133, the layout control section 134, the drawing processing section 135 and the event processing section 136 in the page process 13*b* are described as a "context retention section 133*b*", a "layout control section 134*b*", a "drawing processing section 135*b*" and an "event processing section 136*b*".

When an operation of a user is accepted for the sub-content v515 displayed on a browser, first, the input/output management section 115 recognizes this operation as an operation for the content v51 which is a parent content of this. Then, the input/output management section 115 specifies the page process 13a to which the content v51 is allocated, based on the management information d10 stored in the management data storage section 113, and notifies an input event to the event processing section 136a of this page process 13a.

When the input event is acquired from the input/output management section 115, the event processing section 136a collates the acquired input event with a context retained in the context retention section 133a, and recognizes that the operation target is the sub-content v515.

On the other hand, the context of the sub-content v515 is not retained in the context retention section 133a. Accordingly, the event processing section 136a notifies, to the input/output management section 115, that the acquired input event is an input event for the sub-content v515. When this notification is received, the input/output management section 115 specifies the page process 13b to which the sub-content v515 is allocated, based on the management information d10 stored in the management data storage section 113, and notifies an input event to the event processing section 136b of this page process 13b. As described above, the input event is transferred from the event processing section 136a of the page process 13a to the event processing section 136b of the page process 13b.

Further, the context retention section 133a instructs an acquisition of a drawing result of the sub-content v515 to the drawing processing section 135a. By receiving this instruction, the drawing processing section 135a requests an output of the drawing result of the sub-content v515 to the input/output management section 115. By receiving this request, the input/output management section 115 requests an output of the drawing result of the sub-content v515 to the drawing processing section 135b of the page process 13b. As described above, the request related to an output of the drawing result of the sub-content v515 is transferred from the drawing processing section 135a of the page process 13a to the drawing processing section 135b of the page process 13b.

When the input event is acquired from the input/output management section 115, the event processing section 136b collates the acquired input event with a context retained in the context retention section 133b, and specifies a component within the sub-content v515 which becomes an operation target.

Then, in the case where a context corresponding to the component which becomes a target is retained in the context retention section 133b, the event processing section 136b updates the context of the component which becomes a target, based on the type of operation notified as the input event.

On the other hand, the drawing processing section 135b of the page process 13b receives a request related to an output of the drawing result of the sub-content v515 from the input/output management section 115. When this request is received, the drawing processing section 135b acquires the context of the sub-content v515, which has been updated based on the input event, from the context retention section 133b, via the layout control section 134b. Then, the drawing processing section 135b draws a screen of the sub-content v515 based on the acquired context, and outputs a drawing result to the input/output management section 115.

When a drawing result of the updated sub-content v515 is acquired from the drawing processing section 135b of the page process 13b, the input/output management section 115 outputs the drawing result of this sub-content v515 to the drawing processing section 135a of the page process 13a which is a request source. In this way, the drawing result of the sub-content v515 output from the drawing processing section 135b of the page process 13b is transferred to the drawing processing section 135a of the page process 13a, via the input/output management section 115.

The drawing processing section 135a of the page process 13a embeds the acquired drawing result of the sub-content v515 after being updated within the screen of the content v51, and outputs a screen of this content v51 to the input/output management section 115. The input/output management section 115 acquires the updated screen of the content v51 from the drawing processing section 135 of the page process 13a, and causes the acquired screen to be output to the display section 21. By such a configuration, the screen of the content v51, in which the details of the sub-content v515 have been updated based on a user input, is output to the display section 21.

Heretofore, examples of a functional configuration of the information processing apparatus 10 according to the present embodiment have been described with reference to FIG. 9 to FIG. 15. Note that, while examples have been described above in which the page processes 13a and 13b transmit and receive information via the input/output management section 115, the page process 13a and the page process 13b such as described above may transmit and receive direct information, such as previously described.

As described above, the information processing apparatus 10 according to the present embodiment classifies each of the sub-contents based on conditions determined in advance, and allocates each of the sub-contents to any one of the plurality of page processes 13 based on this classification result. In this way, each of the sub-contents and each of the processes are associated with each other.

By such a configuration, for example, it becomes possible for the information processing apparatus 10 according to the present embodiment to control the number of processes for outputting each of the sub-contents, in accordance with the processing performance of itself. Accordingly, for example, even in the case where the larger number of contents (for example, a large number compared to the case where contents are output to a small-sized display) are output, such as shown in FIG. 2 and FIG. 3, it becomes possible for the information processing apparatus 10 according to the present embodiment to prevent in advance the situation where processes exceeding the processing performance of itself are operated, and to suppress a reduction of the processing performance.

On the basis of the above-described configuration, it becomes possible for the information processing apparatus 10 according to the present embodiment to allocate sub-contents protected by a security function to processes different to those of other sub-contents, for example. Accordingly, it becomes possible for the information processing apparatus 10 to protect sub-contents protected by a security function from a malicious attack via the other sub-content.

Further, it is also possible for the information processing apparatus 10 according to the present embodiment to allocate sub-contents with a high possibility of the processes ending abnormally (in other words, sub-contents for which operation becomes easily unstable), for example, based on the above described configuration, to processes different to those of other sub-contents. Accordingly, it becomes possible for the information processing apparatus 10 to stably output other sub-contents, regardless of the operation condition of the processes to which sub-contents for which operation becomes easily unstable are allocated.

2. Embodiment Examples

Next, as embodiment examples, an example of a method in which the process management section 111 of the information processing apparatus 10 according to the present embodiment classifies each of the contents and each of the sub-contents, and an example of a method in which the process management section 111 allocates the contents and the sub-contents for each of the page processes 13, will be described hereinafter. Note that, while the embodiment of the present disclosure describes, as an example, processing which sets a sub-content as a target, it will also be the same for a content including this sub-content, and in the case where a content is set as a target, "sub-content" may be arbitrarily changed to be read as "content".

2.1. Embodiment Example 1: Classification Based on the Distribution Source

First, as a first embodiment example, an example will be described for the case where the process management section 111 classifies each of the sub-contents, based on the distribution sources of the sub-contents.

As described above, the process management section 111 acquires URLs of these sub-contents, for example, as meta information of each of the sub-contents, and can recognize the distribution sources of the sub-contents based on these URLs.

Accordingly, it becomes possible for the process management section 111 to classify each of these sub-contents, so that each of the sub-contents with different distribution sources are allocated to mutually different page processes 13, based on the URLs acquired as meta information.

By such a configuration, even in the case where sub-contents (for example, Web advertisements) with different distribution sources are embedded within a content, it becomes possible for the process management section 111 to perform classification so that this content and these sub-contents are allocated to mutually different page processes 13.

Further, the process management section 111 may store in advance the URLs of sites which distribute sub-contents provided as advertisements as a list. By using such a list, it becomes possible for the process management section 111 to classify each of these sub-contents into sub-contents provided as advertisements, and sub-contents other than these, based on the URLs of each of the sub-contents. Accordingly, for example, it becomes possible for the process management section 111 to classify each of the sub-contents, so that each of the sub-contents provided as advertisements are mutually allocated to the same page process 13.

Note that, it is needless to say that the list of URLs stored in advance in the process management section 111 is not limited to a list of URLs of sites which distribute sub-contents provided as advertisements. As a specific example, a list of URLs of the sub-contents classified in the process management section 111 may be stored in advance in this process management section 111, so as to be mutually allocated to the same page process 13. In this way, it becomes possible for the process management section 111 to classify each of the sub-contents, so that each of the sub-contents corresponding to the URLs included within this list are mutually allocated to the same page process 13.

Further, as another example, a list of URLs of the sub-contents classified in the process management section 111 may be stored in advance in this process management section 111, so as to be allocated to page processes 13 different to those of other sub-contents. As a specific example, the URLs of sub-contents allocated to the page processes 13 which have previously ended abnormally may be recorded as a list, and this list may be stored in this process management section 111. By such a configuration, it becomes possible for the process management section 111 to allocate sub-contents with a high possibility of the page process 13 ending abnormally compared to that of the other sub-contents (in other words, sub-contents for which operation becomes easily unstable) to page processes 13 different to those of other sub-contents. In this way, it becomes possible for the information processing apparatus 10 to stably output other sub-contents, regardless of the operation condition of the processes to which sub-content for which operation become easily unstable are allocated.

Further, there will be cases where the information processing apparatus 10 is constituted to be capable of accessing only presented link addresses, without having input interfaces such as URLs made public, such as a television apparatus or the like. In this way, in the case where the information processing apparatus 10 is constituted to be capable of acquiring only limited contents, it is possible for the information processing apparatus 10 to recognize in advance a list of the acquired sub-contents. Accordingly, in such a case, a corresponding relationship between each of the acquired sub-contents and each of the page processes 13 may be determined in advance, and a list of URLs of each of these sub-contents may be generated in advance by classifying each of the sub-contents based on this corresponding relationship.

2.2. Embodiment Example 2: Classification Based on the Type of Sub-Contents

Next, as a second embodiment example, an example will be described for the case where the process management section 111 classifies each of the sub-contents, based on the data type of the sub-contents.

As described above, the process management section 111 acquires information showing the data type of sub-contents (for example, information showing a data form of a still image, a moving image or the like), for example, as meta information of each of these sub-contents, and can recognize the type of the sub-contents based on this information.

Accordingly, the process management section 111 may classify each of the sub-contents, so that sub-contents with a large capacity of memory, which may be necessary for an output compared to that of other types such as moving images (for example, character information), are allocated to page processes 13 different to those of other types of sub-content.

By such a configuration, for example, even if a page process 13, to which sub-contents constituted as moving images are allocated, ends abnormally without memory which may be necessary for an output being able to be secured, it becomes possible for the information processing apparatus 10 to stably output other sub-contents.

2.3. Embodiment Example 3: Classification Based on the Processing Type

Next, as a third embodiment example, an example will be described for the case where the process management section 111 classifies each of the sub-contents, in accordance with the type of internal processing applied to the sub-contents, when outputting the sub-contents. Note that, "internal processing" in the present explanation is provided as an API by an OS, for example, and corresponds to the functions or the like executed by having various types of applications call this API.

For example, in the case where the sub-contents are character information, this character information will not necessarily be limited to that described based on prescribed character codes, and there will be cases where the details of internal processing applied for outputting these sub-contents are different, in accordance with these character codes.

Further, not only will sub-contents (data) immediately output be necessarily included within the sub-contents, but sub-contents (data) to be read ahead which are read in advance will also be included in order to immediately respond to an assumed user input. In this way, there will be cases where the details of internal processing applied for outputting these sub-contents are different, in the sub-contents immediately output and the sub-contents to be read ahead.

Accordingly, the process management section 111 estimates the internal processing applied to these sub-contents, based on meta information of each of the sub-contents. Then, the process management section 111 classifies each of the sub-contents, so that sub-contents with a high possibility that internal processing of a same type is applied are mutually allocated to the same page process 13, based on this estimation result.

As a specific example, the process management section 111 classifies each of the sub-contents, so that a plurality of sub-contents which include character information mutually described by the same character codes are mutually allocated to the same page process 13. By such a configuration, the frequency will increase for internal processing to be executed with prescribed character codes set as a target, from this page process 13. Accordingly, for example, it becomes possible for this page process 13 to cause a hit rate (for example, a hit rate of a glyph cache) to be improved when searching for an internal processing which becomes an execution target, from among each internal processing developed in a memory space, when executing a prescribed internal process.

Further, the process management section 111 may distinguish whether or not these sub-contents are sub-contents to be read ahead, based on meta information of each of the sub-contents, and the sub-contents to be read ahead may be classified so as to be allocated to the page processes 13 different to those of other sub-contents. By such a configuration, even in the case where the response of the page process 13 has reduced in accordance with reading ahead, it becomes possible to stably output other sub-contents.

2.4. Embodiment Example 4: Classification of Sub-Contents Protected by a Security Function Next, as a fourth embodiment example, an example will be described for the case where the process management section 111 classifies the sub-contents protected by a security function by distinguishing these sub-contents from other sub-contents.

As described above, for example, the process management section 111 according to the present embodiment may classify each of the sub-contents, so that the sub-contents protected by a security function such as an association function and the other sub-contents are allocated to mutually different processes.

At this time, the process management section 111 may distinguish the sub-contents protected by a security function and the other sub-contents, based on a communication protocol for distributing each of the sub-contents. As a specific example, the process management section 111 may determine whether or not these sub-contents are protected by a security function, in accordance with whether or not the communication protocol for distributing each of the sub-contents is a protocol for protecting a communication route such as SSL/TLS.

Further, the example described above is merely an example, and it is needless to say that this method will not be particularly limited if the process management section 111 is able to determine whether or not each of the sub-contents are protected by a security function.

By such a configuration, for example, it becomes possible for the information processing apparatus 10 to allocate sub-contents protected by a security function to processes different to those of other sub-contents. Accordingly, it becomes possible for the information processing apparatus 10 to protect sub-contents protected by a security function from a malicious attack via the other sub-content.

2.5. Embodiment Example 5: Classification Based on the Occupancy Rate of Resources There will be cases where each of the sub-contents have a different capacity of memory which may be necessary for an output, or a different load for a processor at the time of an output (the exclusive frequency of the processor), in accordance with the type of data (for example, character information, a still image, a moving image or the like) or the presence or not of a script. Accordingly, the information processing apparatus 10 according to a fifth embodiment example classifies each of the sub-contents in accordance with an occupancy rate of resources such as the capacity of memory, the exclusive frequency of a processor or the like. Hereinafter, an outline of the information processing apparatus 10 according to the present embodiment example will be described.

For example, there will be many cases where the capacity of memory which may be necessary for an output is large compared to that of other sub-contents, such as sub-contents which output images such as moving images. Accordingly, the sub-contents with a large capacity of memory which may be necessary for an output monopolizes a large amount of the memory (heaps) allocated to the page processes 13, and there will be cases where the frequency of processing related to an output of other sub-contents allocated to these page processes 13 is reduced.

Accordingly, the process management section 111 of the information processing apparatus 10 according to the present embodiment example may allocate sub-contents with a large capacity of memory, which may be necessary for an output compared to that of other sub-contents, to page processes 13 different to those of other sub-contents.

At this time, the process management section 111 may schematically determine whether or not the capacity of memory which may be necessary for an output of these sub-contents is large, in accordance with the type of the sub-contents. In this case, for example, in the case where the type of the sub-contents is a moving image, the process management section 111 may determine that the capacity of memory which may be necessary for an output is large, and may determine that the capacity of memory which may be necessary for an output is small for other types of sub-contents.

Further, the process management section 111 may schematically determine whether or not the capacity of memory which may be necessary for an output of these sub-contents is large, based on the capacity of the sub-contents themselves. In this case, for example, in the case where the capacity of the sub-contents themselves are at or above a threshold determined in advance, the process management section 111 may determine that the capacity of memory which may be necessary for an output is large, and in the case where the capacity is less than the threshold, the process management section 111 may determine that the capacity of memory which may be necessary for an output is small.

Of course, it is needless to say that this method will not be particularly limited if the process management section 111 is able to recognize the capacity of memory which may be necessary for an output of the sub-contents.

By such a configuration, for example, it becomes possible for the information processing apparatus 10 to prevent the condition of the sub-contents with a large capacity of memory which may be necessary for an output monopolizing a large amount of allocated memory (heaps), and the execution of processing related to an output of other sub-contents being obstructed.

Further, the information processing apparatus 10 may directly or indirectly calculate an exclusive frequency of a processor related to an output of each of the sub-contents, and may allocate the sub-contents with a high occupancy rate of the processor to the page processes 13 different to those of the other sub-contents, based on this calculation result. Note that, in the following description, an example of processing for this case will be additionally and separately described with an example for the case of weighting between sub-contents.

2.6. Embodiment Example 6: Weighting Between Sub-Contents

Next, as a sixth embodiment example, an example will be described for the case where the process management section 111 weights each of the sub-contents, and allocates each of these sub-contents to each of the page processes 13, in accordance with this weighting.

For example, there will be many cases where the priority of main contents provided by various types of sites such as news sites, and sub-contents provided by distribution sources different to those of the main contents, such as Web advertisements or the like, are different for a user who refers to each of the contents via a browser. On the other hand, in the case where each of the processes are operated, it is possible for an OS to causes a part of the processes to be preferentially operated, and prioritization between these processes is performed by a user or various types of software, for example, by using a system call provided by this OS.

Accordingly, the process management section 111 according to the sixth embodiment example weights each of the page processes 13, by using a system call provided by an OS. In addition, the process management section 111 weights each of the sub-contents, and preferentially allocates these weightings to the page processes 13 preferentially operated by the OS, for the sub-contents with a large weighting, in accordance with this weighting.

As a specific example, the process management section 111 classifies each of the sub-contents, so that the weighting of the main contents increases more than that of sub-contents provided by distribution sources different to those of the main contents. Then, the process management section 111 allocates the main contents to the page processes 13 with a high priority, and allocates the sub-contents provided by distribution sources different to those of the main contents to the page processes 13 with a low priority.

By such a configuration, it becomes possible for the information processing apparatus 10 according to the present embodiment example to perform a control so that processing related to an output of sub-contents with a large weighting are preferentially executed compared to those of other sub-contents.

Note that it is possible to distinguish the main contents and the sub-contents provided by distribution sources different to those of these main contents, for example, based on information (URLs) showing the distribution sources of each of the sub-contents, such as previously described.

Further, as another example, the information processing apparatus 10 according to the present embodiment example may weight each of the sub-contents for each type. Note that, the recognition method of the type of each of the sub-contents is that which has been previously described.

By such a configuration, it becomes possible for the process management section 111 to allocate each of the sub-contents to each of the page processes 13, in view of the processing load corresponding to the type of each of the sub-contents, without being limited to the previously described simple classification for each type.

As a specific example, the process management section 111 may limit sub-contents to be additionally allocated to those which include only character information, in the page processes 13 to which sub-contents with a large capacity of memory, which may be necessary for an output compared to that of other types such as moving images, are allocated.

For example, as another example, the information processing apparatus 10 according to the present embodiment example may weight each of the sub-contents, in accordance with an execution frequency of a script included within the sub-contents.

For example, there will be cases where the processing which outputs the sub-contents has a frequency for monopolizing a processor which is different, in accordance with the execution frequency of a script included within the sub-contents. As a specific example, there will be cases where sub-contents, in which the frequency for executing a script is high, have a frequency for monopolizing a processor which is high compared to that of other sub-contents. In this way, when processing related to an output of sub-contents with a high exclusive frequency of a processor is preferentially executed, there will be cases where the execution of processing related to an output of other sub-contents is obstructed.

Accordingly, for example, the information processing apparatus 10 according to the present embodiment example may weight each of the sub-contents, in accordance with the execution frequency of a script or the exclusive frequency of a processor, and may determines the page processes 13 to which these sub-contents are allocated, in accordance with this weighting. As a specific example, the information processing apparatus 10 may perform an allocation to the page processes 13 with a low priority, for sub-contents with a high exclusive frequency of a processor.

Note that, for example, the information processing apparatus 10 may determine whether or not the sub-contents are sub-contents with a high exclusive frequency of a processor based on an operation result of the page processes 13 to which these sub-contents have been previously allocated.

Specifically, for example, the process management section 111 monitors the exclusive frequency of a processor by each of the page processes 13 by using a system call of an OS, and specifies the page processes 13 with an exclusive frequency higher than a threshold based on a result of this monitoring. Then, the process management section 111 specifies the sub-contents allocated to the page processes 13 with an exclusive frequency higher than the threshold based on control information stored in the management data storage section 113, and records the specified sub-contents as a list.

In this way, when the sub-contents recorded to this list are newly allocated to the page processes 13, the process management section 111 can recognize that these sub-contents are sub-contents with a high exclusive frequency of a processor, based on this list.

By the above described configuration, it becomes possible for the information processing apparatus 10 according to the present embodiment example to prevent the condition in which the execution of processing related to an output of other sub-contents is obstructed, by having processing related to an output of sub-contents with a high exclusive frequency of a processor preferentially executed.

2.7. Embodiment Example 7: Weighting Between Page Processes

Next, as a seventh embodiment example, an example will be described for weighting between page processes 13 (priority weighting), in the case where the process management section 111 allocates sub-contents to the page processes 13.

For example, in the case where the process management section 111 allocates sub-contents of some classification, there will be cases where candidates of the page process 13 which becomes an allocation source are present. In such a case, the process management section 111 may perform weighting between the page processes 13, and may determine the page process 13 which becomes an allocation source of the sub-contents, based on this weighting.

As a specific example, the process management section 111 may weight each of these page processes 13, based on the height of a processing load of each of the page processes 13. In this case, for example, the process management section 111 may preferentially allocate the sub-contents to the page processes 13 with a lower processing load.

Note that, the process management section 111 may recognize the processing load of each of the page processes 13, for example, based on a system call provided by an OS.

Further, as another example, the process management section 111 may weight each of these page processes 13, in accordance with the number of sub-contents allocated to each of the page processes 13. In this case, for example, the process management section 111 may preferentially allocate the sub-contents to the page processes 13 which have a small number of allocated sub-contents.

Note that, the process management section 111 may recognize the number of sub-contents allocated to each of the page processes 13 based on management information stored in the management data storage section 113.

By the above described configuration, it becomes possible for the information processing apparatus 10 according to the present embodiment example to allocate each of the sub-contents, by preferentially selecting the page processes 13 with a low processing load. In this way, it becomes possible for the information processing apparatus 10 according to the present embodiment example to more efficiently execute processing related to an output of each of the sub-contents.

3. Modified Example

Next, a modified example of the information processing system according to the present embodiment will be described. In the information processing system according to the embodiments shown above, the information processing apparatus 10 executes processing related to a classification of each of the sub-contents. On the other hand, for example, a server 90 (refer to FIG. 1) such as a proxy server or an edge server may execute processing related to a classification of each of the sub-contents. Accordingly, an example will be described by focusing on the portions different to those of the above described embodiments, as a modified example of the information processing system according to the present embodiment, for the case where processing related to a classification of each of the sub-contents is executed by the server 90.

In the information processing system according to the modified example, the server 90 executes processing in which the process management section 111 classifies each of the sub-contents, which has been shown in "1.4.1. Classification of sub-contents". That is, the server 90 may classify each of the sub-contents, based on meta information included in the acquired sub-contents. Note that, the method which classifies each of the sub-contents is to the same as processing for the case where the process management section 111 classifies each of the sub-contents. As described above, the server 90 associates each of the sub-contents and each of the processes with each other.

When the classification of each of the sub-contents is completed, the server 90 notifies information showing this classification result to the information processing apparatus 10. At this time, the method in which the server 90 notifies information showing a classification result to the information processing apparatus 10 will not be particularly limited.

For example, the server 90 may additionally perform distribution, to this information processing apparatus 10, for the sub-contents corresponding to information showing a classification result, by embedding information showing a classification result of each of the sub-contents as meta information in these sub-contents.

Further, as another example, the server 90 may transmit information showing a corresponding relationship between the sub-contents and a classification result to the information processing apparatus 10 in association with these sub-contents.

By the above described configuration, the process management section 111 of the information processing apparatus 10 can recognize a classification result of each of the sub-contents by the server 90. Then, the process management section 111 of the information processing apparatus 10 may allocate each of the sub-contents to each of the page processes 13, in accordance with the classification result by the server 90.

Heretofore, such as described as the modified example, the information processing system according to the present embodiment may be constituted so as to execute processing related to a classification of each of the sub-contents by the server 90. By such a configuration, since it may not be necessary to execute processing related to a classification of each of the sub-contents at the information processing apparatus 10 side, it becomes possible for the processing load of the information processing apparatus 10 to be reduced.

4. Hardware Configuration

Next, an example of a hardware configuration of the information processing apparatus 10 according to an embodiment of the present disclosure will be described with reference to FIG. 16. FIG. 16 is a figure which shows an example of a hardware configuration of the information processing apparatus 10 according to the present embodiment.

As shown in FIG. 16, the information processing apparatus 10 according to the present embodiment includes a processor 901, a memory 903, a storage 905, an operation device 907, a display device 909, a communication device 911, and a bus 913.

The processor 901 may be, for example, a Central Processing Unit (CPU), a Graphics Processing Unit (GPU), a Digital Signal Processor (DSP) or a System on Chip (SoC), and executes various types of processing of the information processing apparatus 10. The processor 901 is capable of being constituted, for example, by an electronic circuit for executing various types of operation processing. Note that, each of the functions of the previously described process 11 and page processes 13 can be executed by the processor 901.

The memory 903 includes a Random Access Memory (RAM) and a Read Only Memory (ROM), and stores programs and data executed by the processor 901. The storage 905 can include a storage medium such as a semiconductor memory or a hard disk. For example, the previously described management data storage section 113 and context retention section 133 can be constituted by at least one of the memory 903 and the storage 905, or by a combination of both.

The operation device 907 has a function which generates input signals for a user to perform a desired operation. The operation device 907 may be constituted, for example, by an input section for a user to input information such as buttons or switches, and an input control circuit which generates input signals based on an input by a user, and supplies the generated input signals to the processor 901.

The display device 909 is an example of an output device, and may be a display device such as a Liquid Crystal Display (LCD) device, an Organic Light Emitting Diode (OLED) display device or the like. The display device 909 can provide information by displaying a screen for a user. Note that, the previously described display device 20 may be constituted as this display device 909, or the display device 909 may be included separately from the display device 20.

The communication device 911 is a communication mechanism included in the information processing apparatus 10, and communicates with an external device via a network. The communication device 911 is a wired or wireless communication interface. This communication device 911 may include a communication antenna, a Radio Frequency (RF) circuit, a baseband processor or the like, in a case where the communication device 911 is configured as a wireless communication interface.

The communication device 911 has a function which performs various types of signal processing for signals received from an external device, and is capable of supplying digital signals generated from received analog signals to the processor 901.

The bus 913 mutually connects the processor 901, the memory 903, the storage 905, the operation device 907, the display device 909 and the communication device 911. The bus 913 may include a plurality of types of buses.

Further, it is possible for hardware such as a processor, memory and storage built into a computer to also create programs for exhibiting functions the same as those of the above described configuration of the information processing apparatus 10. Further, a computer-readable storage medium, which records these programs, can also be provided.

5. Summary

Heretofore, in the information processing system according to the present embodiment, such as described above, the information processing apparatus 10 classifies each of the sub-contents based on conditions determined in advance, and allocates each of the sub-contents to any one of the plurality of page processes 13 based on this classification result.

By such a configuration, for example, it becomes possible for the information processing apparatus 10 according to the present embodiment to control the number of processes for outputting each of the sub-contents, in accordance with the processing performance of itself. Accordingly, for example, even in the case where a comparatively large number of contents (for example, a large number compared to the case where contents are output to a small-sized display) are output, such as shown in FIG. 2 and FIG. 3, it becomes possible for the information processing apparatus 10 according to the present embodiment to prevent in advance the situation where processes exceeding the processing performance of itself are operated, and to suppress a reduction of the processing performance.

On the basis of the above-described configuration, it becomes possible for the information processing apparatus 10 according to the present embodiment to allocate sub-contents protected by a security function to processes different to those of other sub-contents, for example. Accordingly, it becomes possible for the information processing apparatus 10 to protect sub-contents protected by a security function from a malicious attack via the other sub-content.

Further, it is also possible for the information processing apparatus 10 according to the present embodiment to allocate sub-contents with a high possibility of the processes ending abnormally (in other words, sub-contents for which operation becomes easily unstable), for example, based on the above described configuration, to processes different to those of other sub-contents. Accordingly, it becomes possible for the information processing apparatus 10 to stably output other sub-contents, regardless of the operation condition of the processes to which sub-contents for which operation becomes easily unstable are allocated.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:

an acquisition section which acquires a plurality of sub-contents included in each of one or more contents; and a management section which associates the acquired plurality of sub-contents with at least any one process from among a plurality of processes for executing processing related to an output of one or more of the sub-contents.

(2) The information processing apparatus according to (1),
wherein the acquisition section acquires the contents, and acquires the plurality of sub-contents by extracting the plurality of sub-contents included in the acquired contents.

(3) The information processing apparatus according to (1) or (2),
wherein the management section associates the plurality of sub-contents with the processes in accordance with a transmission source of the sub-contents.

(4) The information processing apparatus according to any one of (1) to (3),
wherein the management section associates each of the sub-contents of a same type with the same process based on a type of the sub-contents.

(5) The information processing apparatus according to any one of (1) to (4),
wherein the management section weights the plurality of sub-contents in accordance with a type of the sub-contents, and associates each of the sub-contents with a different weighting with mutually different processes.

(6) The information processing apparatus according to any one of (1) to (5),
wherein the management section associates the sub-content protected by a security function, from among the plurality of sub-contents, with the process different to the processes of other sub-contents.

(7) The information processing apparatus according to any one of (1) to (6),
wherein the management section associates the sub-content with a capacity at or above a threshold, from among the plurality of sub-contents, with the process different to the processes of other sub-contents.

(8) The information processing apparatus according to any one of (1) to (7),
wherein the management section associates the sub-content with a frequency for operating a script included internally at or above a threshold, from among the plurality of sub-contents, with the process different to the processes of other sub-contents.

(9) The information processing apparatus according to any one of (1) to (8),
wherein the management section associates sub-contents with a same type of processing to be applied to the sub-contents with the same process based on a type of the processing to be applied.

(10) The information processing apparatus according to any one of (1) to (9),
wherein the management section associates two or more sub-contents determined in advance, from among the plurality of sub-contents, with the same process.

(11) The information processing apparatus according to any one of (1) to (10),
wherein the management section allocates each of the plurality of sub-contents to at least any one of the plurality of processes based on a correspondence between the plurality of sub-contents and the plurality of processes.

(12) The information processing apparatus according to (11),
wherein the management section weights the plurality of processes in association with a processing load of each of the plurality of processes, and associates the plurality of sub-contents, in association with the weighting, so that the processes are determined to which each of the plurality of sub-contents are allocated.

(13) The information processing apparatus according to (12),
wherein the management section preferentially associates the sub-contents with the processes in which the processing load is low.

(14) The information processing apparatus according to (11),
wherein the management section weights the plurality of processes in association with the number of the sub-contents allocated to each of the plurality of processes, and associates the plurality of sub-contents, in association with the weighting, so that the processes are determined to which each of the plurality of sub-contents are allocated.

(15) The information processing apparatus according to (14),
wherein the management section preferentially associates the sub-contents with the processes to which a number of the allocated sub-contents is low.

(16) The information processing apparatus according to any one of (1) to (10),
wherein the management section notifies management information showing a result which associates the plurality of sub-contents with at least any one of the processes to an external device which allocates the plurality of sub-contents to at least any one of the processes.

(17) The information processing apparatus according to any one of (1) to (15), further including:
a display control section which causes the sub-contents allocated to the processes to be displayed on a display section based on an output result of the processes.

(18) The information processing apparatus according to (17), further including:
the display section.

(19) A non-transitory computer-readable recording medium having a program recorded therein, the program causing a computer to execute:
acquiring a plurality of sub-contents included in each of one or more contents; and
associating the acquired plurality of sub-contents with at least any one process from among a plurality of processes for executing processing related to an output of one or more of the sub-contents.

What is claimed is:
1. An information processing apparatus, comprising:
an acquisition section configured to:
acquire a plurality of sub-contents from at least one transmission source, wherein the plurality of sub-contents are included in at least one content, and
output at least one sub-content of the plurality of sub-contents;
an analysis section configured to extract meta information associated with the at least one sub-content of the plurality of sub-contents based on a context of the at least one sub-content; and
a management section configured to:
acquire the meta information from the analysis section,
associate the plurality of sub-contents with at least one process from a plurality of processes, wherein the plurality of processes are related to the output of the at least one sub-content of the plurality of sub-contents,
wherein the association of the at least one sub-content of the plurality of sub-contents with the at least one process is based on at least one of the meta infor- mation or the at least one transmission source from where the at least one sub-content is acquired.

2. The information processing apparatus according to claim 1, wherein the acquisition section is further configured to acquire the at least one sub-content.

3. The information processing apparatus according to claim 1, wherein the management section is further configured to associate each of the plurality of sub-contents of a type with a process of the plurality of processes.

4. The information processing apparatus according to claim 1, wherein the management section is further configured to:
   weight the plurality of sub-contents based on a type of the plurality of sub-contents, and
   associate the at least one sub-content of the plurality of sub-contents with a process of the plurality of processes based on the weight of the at least one sub-content.

5. The information processing apparatus according to claim 1, wherein the management section is further configured to associate the at least one sub-content protected by a security function, from the plurality of sub-contents, with a process of the plurality of processes different from processes of other sub-contents of the plurality of sub-contents.

6. The information processing apparatus according to claim 1, wherein the management section is further configured to associate the at least one sub-content that has a capacity at or above a threshold, from the plurality of sub-contents, with a process of the plurality of processes different from processes of other sub-contents of the plurality of sub-contents.

7. The information processing apparatus according to claim 1, wherein the management section is further configured to associate the at least one sub-content that operates a script included internally at a frequency equal to or above a threshold, from the plurality of sub-contents, with a process of the plurality of processes different from processes of other sub-contents of the plurality of sub-contents.

8. The information processing apparatus according to claim 1, wherein the management section is further configured to associate sub-contents with a type of processing applied from the plurality of sub-contents with a process of the plurality of processes.

9. The information processing apparatus according to claim 1, wherein the management section is further configured to associate at least two sub-contents, from the plurality of sub-contents, with a same process of the plurality of processes.

10. The information processing apparatus according to claim 1, wherein the management section is further configured to allocate each of the plurality of sub-contents to the at least one process based on a correspondence between the plurality of sub-contents and the plurality of processes.

11. The information processing apparatus according to claim 10, wherein the management section is further configured to:
    weight the plurality of processes in association with a processing load of each of the plurality of processes, and
    associate the plurality of sub-contents with the at least one process of the plurality of processes, based on the weight.

12. The information processing apparatus according to claim 11, wherein the management section is further configured to associate the plurality of sub-contents with the at least one process from the plurality of processes, based on a process with a least processing load among the plurality of processes.

13. The information processing apparatus according to claim 10, wherein the management section is further configured to:
    weight the plurality of processes in association with a number of sub-contents of the plurality of sub-contents allocated to each of the plurality of processes, and
    associate the plurality of sub-contents with the at least one process of the plurality of processes, based on the weight.

14. The information processing apparatus according to claim 13, wherein the management section is further configured to associate sub-contents of the plurality of sub-contents with a set of processes of the plurality of processes, wherein the set of processes have a least number of sub-contents allocated among the plurality of processes.

15. The information processing apparatus according to claim 1,
    wherein the management section is further configured to notify management information to an external device which allocates the plurality of sub-contents to the at least one process,
    wherein the management information shows an association of the plurality of sub-contents with the at least one process.

16. The information processing apparatus according to claim 1, further comprising:
    a display control section configured to display the plurality of sub-contents allocated to the at least one process on a display section based on a result of the at least one process.

17. The information processing apparatus according to claim 1, further comprising:
    a display section.

18. The information processing apparatus according to claim 1, wherein the management section is further configured to classify the plurality of sub-contents, for the at least one transmission source, based on the meta information.

19. The information processing apparatus according to claim 1, wherein the analysis section is further configured to generate the context of the plurality of sub-contents based on analysis of the plurality of sub-contents.

20. A non-transitory computer-readable medium having stored thereon computer-executable instructions that, when executed by a processor, cause a computer to execute operations, the operations comprising:
    acquiring a plurality of sub-contents from at least one transmission source, wherein the plurality of sub-contents are included in at least one content;
    outputting at least one sub-content of the plurality of sub-contents;
    extracting meta information associated with the at least one sub-content of the plurality of sub-contents based on a context of the at least one sub-content; and
    associating the plurality of sub-contents with at least one process from a plurality of processes, wherein the plurality of processes are related to the output of the at least one sub-content of the plurality of sub-contents,
    wherein the association of the at least one sub-content of the plurality of sub-contents with the at least one process is based on at least one of the meta information or the at least one transmission source from where the at least one sub-content is acquired.

* * * * *